United States Patent [19]
Handfield et al.

[11] Patent Number: 5,741,966
[45] Date of Patent: Apr. 21, 1998

[54] METHOD AND SYSTEM FOR MONITORING A PARAMETER OF A VEHICLE TIRE

[76] Inventors: Michael Handfield; Helene Laliberte, both of 910 Sherwood Ct., Rochester, Mich. 48307

[21] Appl. No.: 465,763

[22] Filed: Jun. 6, 1995

Related U.S. Application Data

[62] Division of Ser. No. 101,379, Aug. 3, 1993, Pat. No. 5,473,938.

[51] Int. Cl.$^6$ ............................................. B60C 23/00
[52] U.S. Cl. .................... 73/146.5; 73/146.2; 73/146.4
[58] Field of Search ........................... 73/146.2, 146.3, 73/146.5, 146.8; 340/443, 444, 445, 446, 447, 448

[56] References Cited

U.S. PATENT DOCUMENTS

| | | | |
|---|---|---|---|
| Re. 34,095 | 10/1992 | Padula et al. | 178/18 |
| 3,016,515 | 1/1962 | Summers et al. | 340/58 |
| 3,247,719 | 4/1966 | Chelner | 73/420 |
| 3,261,001 | 7/1966 | Magnin | 340/172.5 |
| 3,309,463 | 3/1967 | Roedl | 178/69.5 |
| 3,329,934 | 7/1967 | Wooden | 340/58 |
| 3,596,509 | 8/1971 | Raffaelli | 73/146.3 |
| 3,705,385 | 12/1972 | Batz | 340/152 R |
| 3,806,471 | 4/1974 | Mitchell | 252/518 |
| 3,810,090 | 5/1974 | Davis, Jr. et al. | 340/58 |
| 3,890,595 | 6/1975 | Barabino | 340/58 |
| 3,895,347 | 7/1975 | Takusagawa et al. | 340/58 |
| 3,993,939 | 11/1976 | Slavin et al. | 317/246 |
| 4,048,614 | 9/1977 | Shumway | 340/58 |
| 4,054,540 | 10/1977 | Michalchik | 252/512 |
| 4,057,783 | 11/1977 | Blanchler | 340/58 |
| 4,067,235 | 1/1978 | Markland et al. | 73/146.5 |
| 4,074,227 | 2/1978 | Kalmus | 340/58 |
| 4,101,872 | 7/1978 | Pappas | 340/539 |
| 4,104,595 | 8/1978 | Overzet | 328/1 |
| 4,119,944 | 10/1978 | Smith | 340/58 |
| 4,137,520 | 1/1979 | Deveau | 340/58 |
| 4,160,234 | 7/1979 | Karbo et al. | 340/58 |
| 4,186,377 | 1/1980 | Barabino | 340/58 |
| 4,220,907 | 9/1980 | Pappas et al. | 322/3 |
| 4,237,728 | 12/1980 | Betts et al. | 73/146.5 |
| 4,263,579 | 4/1981 | Corgan et al. | 340/58 |
| 4,276,538 | 6/1981 | Eventoff et al. | 338/69 |
| 4,276,540 | 6/1981 | Habib, Jr. | 340/63 |
| 4,300,118 | 11/1981 | Matsuda et al. | 340/58 |
| 4,301,337 | 11/1981 | Eventoff | 200/5 A |
| 4,313,483 | 2/1982 | Brockmann | 152/416 |
| 4,314,227 | 2/1982 | Eventoff | 338/99 |
| 4,314,228 | 2/1982 | Eventoff | 338/114 |
| 4,314,230 | 2/1982 | Cardinal et al. | 338/314 |
| 4,316,176 | 2/1982 | Gee et al. | 340/58 |
| 4,319,220 | 3/1982 | Pappas et al. | 340/58 |
| 4,328,494 | 5/1982 | Goodall | 340/870.18 |

(List continued on next page.)

FOREIGN PATENT DOCUMENTS

| | | |
|---|---|---|
| 0251355 | 1/1988 | European Pat. Off. |
| 0344003 | 11/1989 | European Pat. Off. |
| 0431217 | 6/1991 | European Pat. Off. |
| 2225300 | 11/1974 | France |
| 2482287 | 11/1981 | France |
| 2504675 | 10/1982 | France |
| 2601533 | 1/1988 | France |
| 2443046 | 4/1975 | Germany |
| 3703128 | 8/1988 | Germany |
| 2210537 | 6/1989 | United Kingdom |
| WO 9214620 | 3/1992 | WIPO |
| WO 9213730 | 8/1992 | WIPO |

*Primary Examiner*—George M. Dombroske
*Assistant Examiner*—Eric S. McCall
*Attorney, Agent, or Firm*—Brooks & Kushman P.C.

[57] ABSTRACT

The present invention relates to a method and system for monitoring a parameter of a vehicle tire. In one embodiment, a detector unit disposed within the tire communicates with a central receiver unit over an electromagnetic path comprising one or more conductive components of the vehicle. Other embodiments of the invention include additional communications links for receiving information from and controlling the detector unit and the receiver.

17 Claims, 17 Drawing Sheets

U.S. PATENT DOCUMENTS

| | | | |
|---|---|---|---|
| 4,334,215 | 6/1982 | Frazier et al. | 73/146.2 |
| 4,451,714 | 5/1984 | Eventoff | 200/5 A |
| 4,467,641 | 8/1984 | Abraham | 73/146.5 |
| 4,468,650 | 8/1984 | Barbee | 340/58 |
| 4,489,599 | 12/1984 | Andrei-Alexandru et al. | 73/146.5 |
| 4,494,106 | 1/1985 | Smith et al. | 340/58 |
| 4,510,484 | 4/1985 | Snyder | 340/58 |
| 4,531,112 | 7/1985 | Thomas | 340/58 |
| 4,554,528 | 11/1985 | Burkel et al. | 340/58 |
| 4,571,588 | 2/1986 | Lee et al. | 340/870.13 |
| 4,619,137 | 10/1986 | Bott | 73/146.5 |
| 4,693,112 | 9/1987 | Ferris | 73/146.8 |
| 4,695,823 | 9/1987 | Vernon | 340/58 |
| 4,703,650 | 11/1987 | Dosjoub et al. | 73/146.5 |
| 4,711,130 | 12/1987 | Glass et al. | 73/708 |
| 4,717,905 | 1/1988 | Morrison, Jr. et al. | 340/58 |
| 4,723,445 | 2/1988 | Ripley et al. | 73/146.5 |
| 4,737,761 | 4/1988 | Dosjoub et al. | 340/58 |
| 4,742,857 | 5/1988 | Gandhi | 152/418 |
| 4,747,761 | 5/1988 | Yumiyama et al. | 418/46 |
| 4,749,993 | 6/1988 | Szabo et al. | 340/870.31 |
| 4,816,802 | 3/1989 | Doerksen et al. | 340/447 |
| 4,823,107 | 4/1989 | Pompier | 340/442 |
| 4,853,690 | 8/1989 | Mayer et al. | 340/544 |
| 4,875,378 | 10/1989 | Yamazaki et al. | 73/862.04 |
| 4,891,973 | 1/1990 | Bollweber et al. | 73/146.5 |
| 4,909,074 | 3/1990 | Gerresheim et al. | 73/146.4 |
| 4,929,851 | 5/1990 | Pace | 307/359 |
| 4,935,738 | 6/1990 | Pilato | 340/870.24 |
| 4,966,034 | 10/1990 | Bock et al. | 73/146.5 |
| 4,975,679 | 12/1990 | Ballyns | 340/442 |
| 5,001,457 | 3/1991 | Wang | 340/447 |
| 5,014,224 | 5/1991 | Hans | 338/99 |
| 5,032,845 | 7/1991 | Velasco | 342/457 |
| 5,033,295 | 7/1991 | Schmid et al. | 73/146.5 |
| 5,038,069 | 8/1991 | Lukasiewicz et al. | 310/338 |
| 5,040,562 | 8/1991 | Achterholt | 137/227 |
| 5,050,110 | 9/1991 | Rott | 73/146.2 |
| 5,054,315 | 10/1991 | Dosjoub | 73/146.5 |
| 5,060,527 | 10/1991 | Burgess | 73/862.68 |
| 5,079,536 | 1/1992 | Chapman | 338/99 |
| 5,090,237 | 2/1992 | Schrumpf et al. | 73/146.5 |
| 5,109,213 | 4/1992 | Williams | 340/447 |
| 5,140,851 | 8/1992 | Hettich et al. | 73/146.5 |
| 5,186,054 | 2/1993 | Sekimura | 73/724 |
| 5,193,387 | 3/1993 | Hodate | 73/146.5 |
| 5,196,845 | 3/1993 | Myatt | 340/870.31 |
| 5,230,243 | 7/1993 | Reinecke | 73/146.3 |
| 5,231,872 | 8/1993 | Bowler et al. | 73/146.5 |
| 5,260,683 | 11/1993 | Tanaka et al. | 340/448 |
| 5,274,355 | 12/1993 | Galan | 340/445 |
| 5,285,189 | 2/1994 | Nowicki et al. | 340/447 |
| 5,289,160 | 2/1994 | Fiorletta | 340/447 |
| 5,297,424 | 3/1994 | Sackett | 73/146.5 |
| 5,301,553 | 4/1994 | Schultz et al. | 73/705 |
| 5,302,939 | 4/1994 | Downs et al. | 340/447 |
| 5,315,866 | 5/1994 | Righi | 73/146.5 |
| 5,349,328 | 9/1994 | Lonzame | 340/442 |
| 5,359,886 | 11/1994 | Pradelle | 73/146.2 |

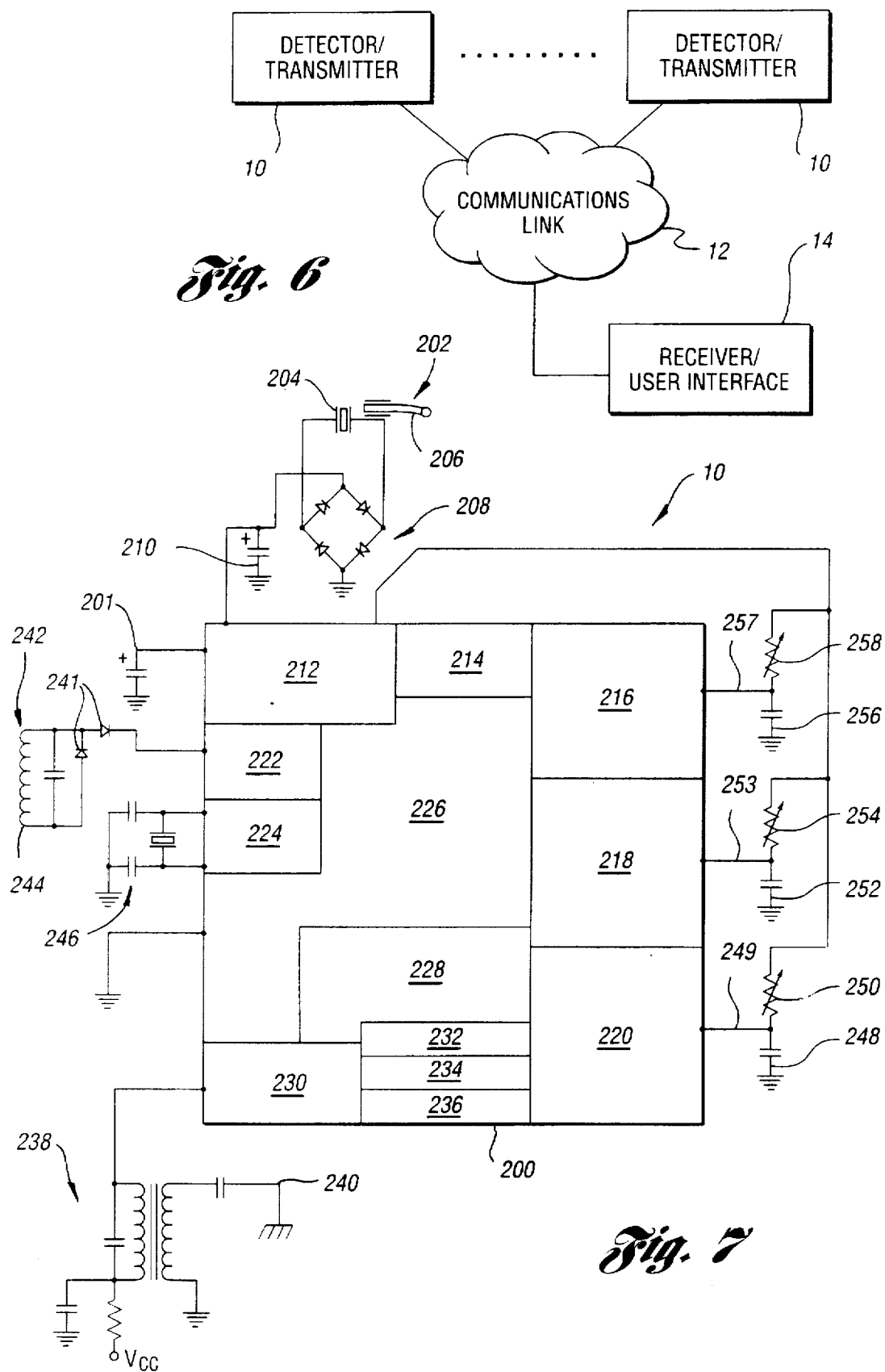

RS-232 CONTROL COMMANDS

INTERROGATES THE TPMS-3000 UNIT WITH ANY STANDARD COMMUNICATIONS SOFTWARE. (I.E. XMODEM, SMART MODEM ETC.)

| NAME | SYNTAX | FUNCTIONS |
|---|---|---|
| C | C<CR> | Read Software Version & Serial Number |
| D | Dddddddddddddddddddddddd<CR> | Program Vehicle ID Code (24 Characters) |
| I | I<CR><br><file> | Data to Program up to 256 Tires |
| L | LBB,EE<CR> | List Tire Alarms from Month bb to Month ee |
| N | Ndddddddd<CR> | Enter New Password |
| O | O<CR> | Output all Events and Reset Memory |
| P | P1mm,dd,yy<CR><br>P2hh,mm<CR><br>P3www,dddddddddddddddd<CR> | 1 = Program Date<br>2 = Program Time<br>3 = Program Tire Number and Label |
| R | R<CR> | Read all Events but do not Reset Memory Location |
| T | Tx<CR> | X = 1  Read Time and Date<br>X = 2  Read all Tires and Labels<br>X = 3  Read Vehicle ID<br>X = 4  Raed Log Number<br>X = 5  Read Driver Number |
| V | Vdddddddd<CR> | First Command to Send Before Requesting any Other Information<br>dddddddd = Password |

Fig. 11

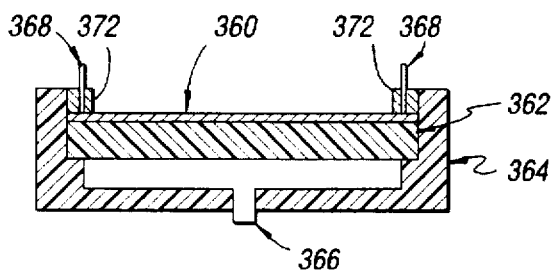

Fig. 12a

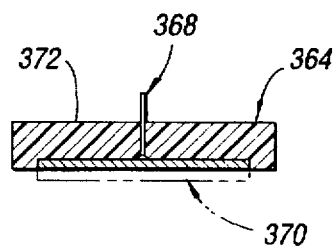

Fig. 12b

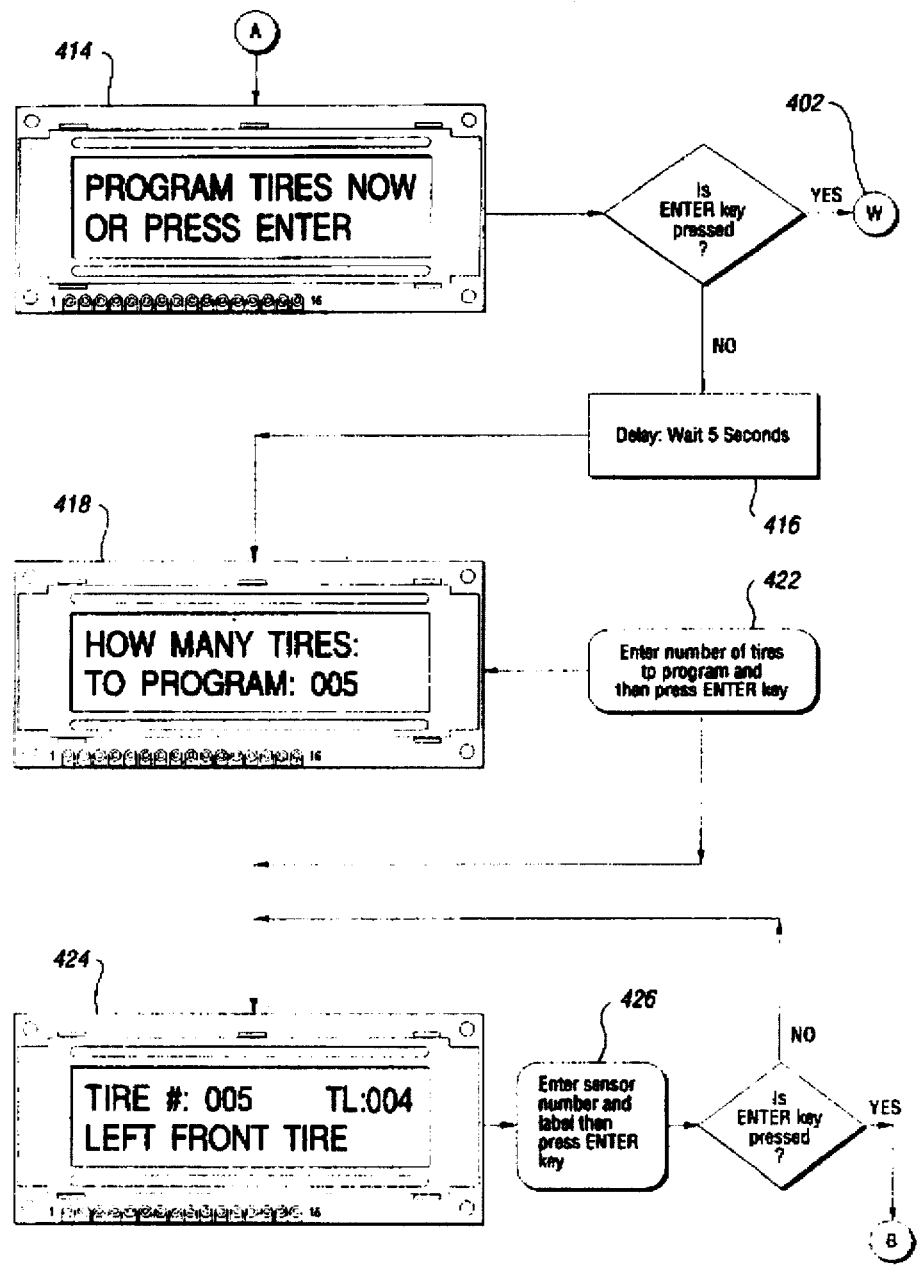

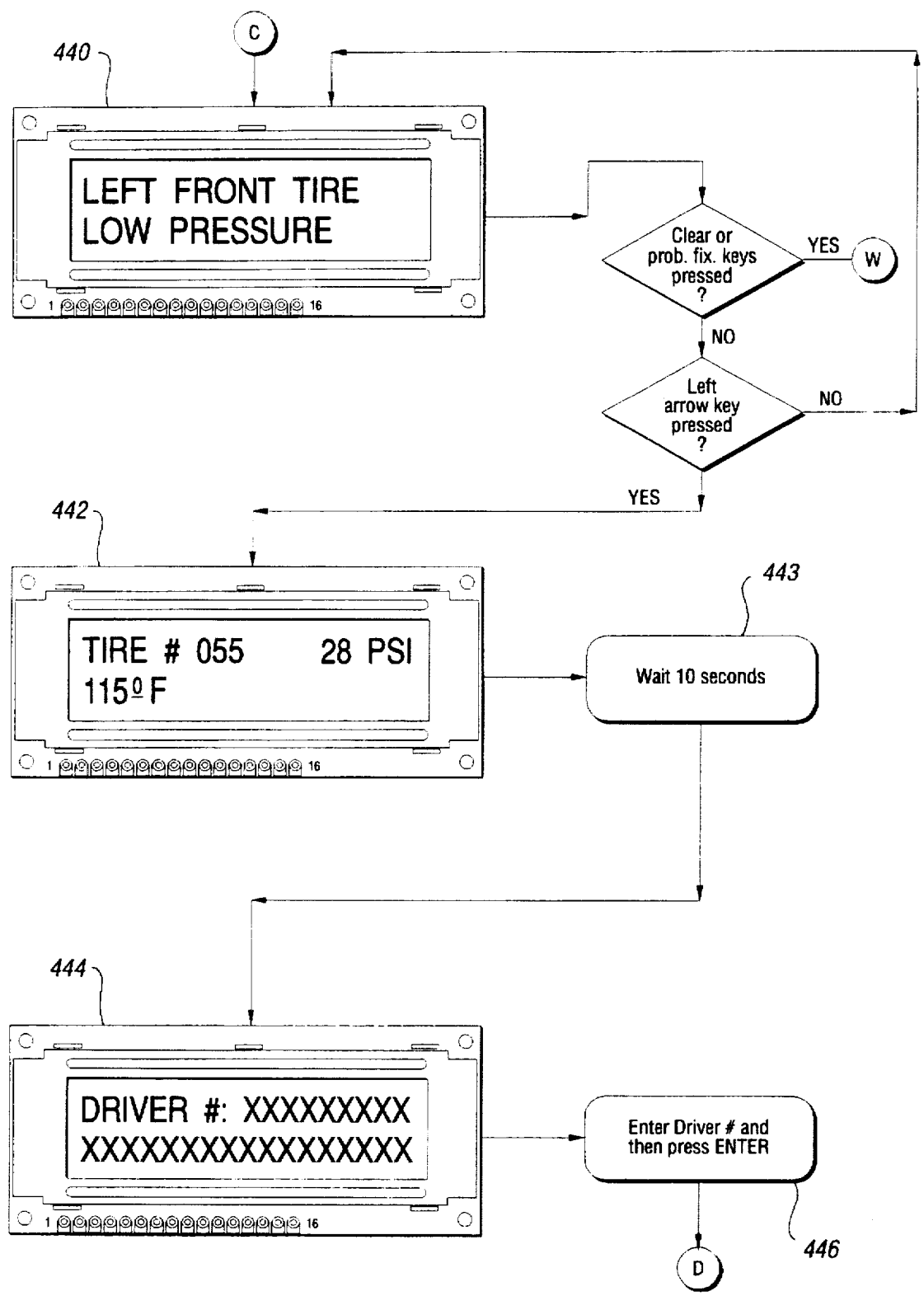

METHOD AND SYSTEM FOR MONITORING A PARAMETER OF A VEHICLE TIRE

This is a divisional of application Ser. No. 08/101,379 filed on Aug. 3, 1993 U.S. Pat. No. 5,473,938.

TECHNICAL FIELD

The present invention relates to a method and system for monitoring a parameter of a vehicle tire and more particularly to tire temperature and pressure monitoring systems for a vehicle.

BACKGROUND ART

Motor vehicles which are supported by inflatable tires generally have a desired inflation pressure. The improper inflation of a tire can lead to poor gas mileage, increased tire wear and to a loss of handling ability, particularly during emergency braking and maneuvering conditions.

Unfortunately, many motor vehicle operators do not take the time to monitor the pressure in their tires. Once the tires are inflated, pressure generally is not measured unless a tire is visibly under-inflated or tire inflation has caused a defect in vehicle handling which is apparent to the operator. By this point, the tire has already been operated in a state of improper inflation.

Prior art devices have attempted to resolve this problem by providing an automatic tire pressure monitoring system for monitoring the pressure within the tires and providing an indication to the vehicle operator when one or more of the tires reaches a condition of improper inflation. One class of such tire pressure monitoring systems includes a tire pressure sensing apparatus as well as a transmitter contained within each of the tires. The tire pressure is monitored and transmitted to a central receiving unit which in turn provides an indication to the vehicle operator.

The use of airwave communications between the transmitter and receiver creates a host of problems. With the transmitting unit wholly contained within a particular tire, relatively weak signals are transmitted since the transmitter must rely upon a battery as a source of power. Further, the metallic configuration of a vehicle frame and body is not generally conducive to the transmission of signals from the wheel wells of a vehicle to a centrally located monitor. Further, as a wheel rotates, a transmitted tire pressure signal is subjected to a doppler shift based upon this rotation if the transmitter antenna is not oriented in a fashion such that its center of mass lies along the axis of rotation of the wheel.

The reliance upon a battery in these prior art systems provides a further problem, that of limited battery life. If a battery is installed in a tire pressure monitoring system within a tire, that battery will require replacement at some point which could require the dismounting of the vehicle tire from the wheel. An alternate source of power for a tire pressure monitoring system is presented by U.S. Pat. No. 4,160,234 to Karbo, et al. This patent discloses a self-powered tire condition indicator system in which a plurality of wheel mounted transmitting assemblies communicate by radio frequency transmission to a receiver located within the operator compartment of the vehicle. Each of the transmitting assemblies generates its own transmitting power by converting the mechanical compression of a flat tire into electrical energy using a piezo-electric transducer. This system, while not requiring a battery for operation, suffers from the fact that a tire must be in a severely deflated condition to energize the unit. Thus, this system is unable to provide a monitoring of the tire pressure during conditions when the tire is properly inflated or if the tire deflation is slight.

A further problem with prior art tire pressure monitoring systems where a pressure sensor and transmitter unit is contained within a tire is that reprogramming or testing of the unit requires dismounting of the tire. This is an inconvenient and expensive process.

Prior art tire pressure monitoring systems further include monitoring of the temperature within a tire. This is important given that increased tire temperature can be indicative of underinflation or other tire defects which again could be a source of concern for a vehicle operator. These prior art systems, however, lack the ability to compare the sensed tire temperature with an ambient temperature to determine if the tire temperature is abnormal given ambient conditions.

SUMMARY OF THE INVENTION

It is thus an object of the present invention to provide a tire pressure monitoring system which includes a reliable communication link between a plurality of sensors located within the tires of a vehicle and a central receiving unit.

A further object of the present invention is to provide a tire pressure monitoring system whereby the vehicle ground provides an electromagnetic path for RF signals between a tire pressure monitoring sensor located within a tire and a central receiving unit.

Moreover, an object of the present invention is to provide a piezo-electric power source for a sensor and transmitter unit of a tire pressure monitoring system located within a vehicle tire such that the sensor and transmitter unit are powered during normal inflation of the tire.

Furthermore, an object of the present invention is to provide a piezo-electrical power source for a sensor and transmitter unit of a tire pressure monitoring system with capacitive storage such that the sensor and transmitter unit is capable of reduced functioning during periods of time that the tires are stationary.

An additional object of the present invention is to provide a communication link between a remote controller connectable to the receiver for reading and storing the various operational parameters of the receiving unit.

An object of the present invention is also to provide a communication link between a detector/transmitter unit disposed within a tire and a remote controlling unit for storing the various parameters of the detector/transmitter unit, for reading the status and operational parameters of the unit, and for initiating a test of the sensor.

Another object of the present invention is to provide a tire parameter monitoring system which monitors the temperature of a tire and further monitors the ambient temperature of the air surrounding a vehicle for the purposes of deriving a differential temperature measurement.

In carrying out the above objects, the present invention provides a method for monitoring a parameter of a tire for a vehicle having one or more conductive components which form an electromagnetic path with first and second ends.

The method comprises the steps of generating a signal indicative of a parameter of the tire using a sensor disposed within the tire, transmitting the generated signal along the electromagnetic path by introducing the generated signal to the electromagnetic path first end, receiving a path signal at the electromagnetic path second end, the path signal being responsive to the generated signal, and monitoring the tire parameter by monitoring the path signal.

In further carrying out the above objects, the present invention provides a system for monitoring a parameter of a tire for a vehicle.

This system comprises a sensor, disposed within the tire, for generating a signal indicative of the parameter of the tire, an electromagnetic path being formed of a plurality of conductive components of the vehicle, the electromagnetic path having first and second ends, a transmitter, in electrical communication with the sensor and with the electromagnetic path first end, for transmitting the generated signal along the electromagnetic path, a receiver, in electrical communication with the electromagnetic path second end, for receiving a path signal at the electromagnetic path second end, the path signal being responsive to the generating signal, a monitor, in electrical communication with the receiver, for monitoring the tire parameter by monitoring the path signal.

Moreover, in carrying out the above objects, the present invention provides a system for monitoring a parameter of a tire for a vehicle.

The system comprises a sensor, disposed within the tire, for generating a signal indicative of the pressure of the tire, an electromagnetic path being formed of a plurality of conductive components of the vehicle including a wheel rim for the tire, one or more wheel bearings for rotatably supporting the wheel on a non-rotating member, and the non-rotating member, the electromagnetic path having first and second ends, a transmitter, in electrical communication with the sensor and with the electromagnetic path first end, for transmitting the generated signal along the electromagnetic path, a receiver, in electrical communication with the electromagnetic path second end, for receiving a path signal at the electromagnetic path second end, the path signal being responsive to the generating signal, a monitor, in electrical communication with the receiver, for monitoring the tire parameter by monitoring the path signal.

In carrying out the above objects, the present invention also provides a system for monitoring the status of a parameter of a tire for a vehicle.

The system comprises a sensor, disposed within the tire, for generating a signal indicative of the parameter of the tire, a processor, in electrical communication with the sensor for determining the status of the tire parameter by comparing the tire parameter to a selected threshold, a transmitter, in electrical communication with the processor for transmitting a status signal indicative of the tire parameter status along a first communications link, a monitor, in communication with the first communications link, for monitoring the status of the tire parameter, a communication unit in electrical communication with the processor having a first receiver for receiving a processor control command, and a remote controller, positionable for electrical communication with the communication unit along a second communications link, for initiating the processor control command.

In addition, in carrying out the above objects, the present invention provides a system for monitoring a parameter of a tire for a vehicle.

The system comprises a sensor, disposed within the tire, for generating a signal indicative of the parameter of the tire, a transmitter, in electrical communication with the sensor for transmitting the generated signal along a first communications link, a monitor, in communication with the first communications link, for monitoring the tire parameter by receiving the generated signal, a processor, in electrical communication with the monitor for determining an alarm condition based upon the monitored tire parameter, a communication unit in electrical communication with the processor having a first receiver for receiving a processor control command, and a remote controller, positionable for electrical communication with the communication unit along a second communications link, for initiating the processor control command.

In carrying out the above objects, the present invention further provides a system for monitoring a parameter of an inflatable tire for a vehicle.

The system comprises a sensor, disposed within the tire, for generating a signal indicative of the parameter of the tire, a transmitter, in electrical communication with the sensor for transmitting the generated signal along a first communications link, a piezo-electric element, for supplying power to the transmitter independent of the inflation pressure of the tire, a monitor, and in communication with the first communications link, for monitoring the tire parameter by receiving the generated signal.

In carrying out the above objects, the present invention moreover provides a system for monitoring a temperature of a tire for a vehicle.

The system comprises a first temperature sensor, disposed within the tire, for generating a signal indicative of the temperature of the tire, a transmitter, in electrical communication with the sensor for transmitting the tire temperature signal along a first communications link, a second temperature sensor, associated with the vehicle, for generating a signal indicative of the ambient temperature of the air surrounding the vehicle, and a monitor, in communication with the first communications link and the second temperature sensor, for determining a temperature parameter in dependence upon the tire temperature signal and the ambient temperature signal.

In carrying out the above objects, the present invention additionally provides a method for providing a user interface for a tire parameter monitoring system for a plurality of tires of a vehicle, the monitoring system having an alarm state triggerable by a parameter fault in any one of the tires.

The method comprises a user interface for a tire parameter monitoring system for a plurality of tires of a vehicle, the monitoring system having an alarm state triggerable by a parameter fault in any one of the tires, the method comprising the steps of displaying, in alphanumeric format, an indication of the occurrence of an alarm state which identifies a particular tire which is the source of the alarm state, receiving a first indication from the user to terminate the alarm condition, terminating the alarm display in response to the receipt of the first user indication, receiving a second indication from the user to provide further information on the source tire, and displaying, in alphanumeric format, the tire parameter corresponding to the source tire in response to the receipt of the second user indication.

BRIEF DESCRIPTION OF THE DRAWINGS

FIG. 6 presents a block diagram representation of one embodiment of the tire pressure monitoring system of the present invention;

FIG. 7 presents a combination schematic/block diagram of one embodiment of the detector/transmitter unit of the tire parameter monitoring system of the present invention;

FIG. 11 provides a summary of control commands for the RS232 interface of the receiver/user interface unit of one embodiment of the tire parameter monitoring system of the present invention;

FIG. 12A presents a vertical cross section of a pressure sensor for use with one embodiment of the tire parameter monitoring system of the present invention;

FIG. 12D presents a top view of the diaphragm of the pressure sensor used with one embodiment of the tire parameter monitoring system of the present invention;

FIGS. 14A-14F present a combination flow chart representation and pictorial representation of the user interface/display functions of the user interface of one embodiment of the tire parameter monitoring system of the present invention;

BEST MODE FOR CARRYING OUT THE INVENTION

Figure 1:
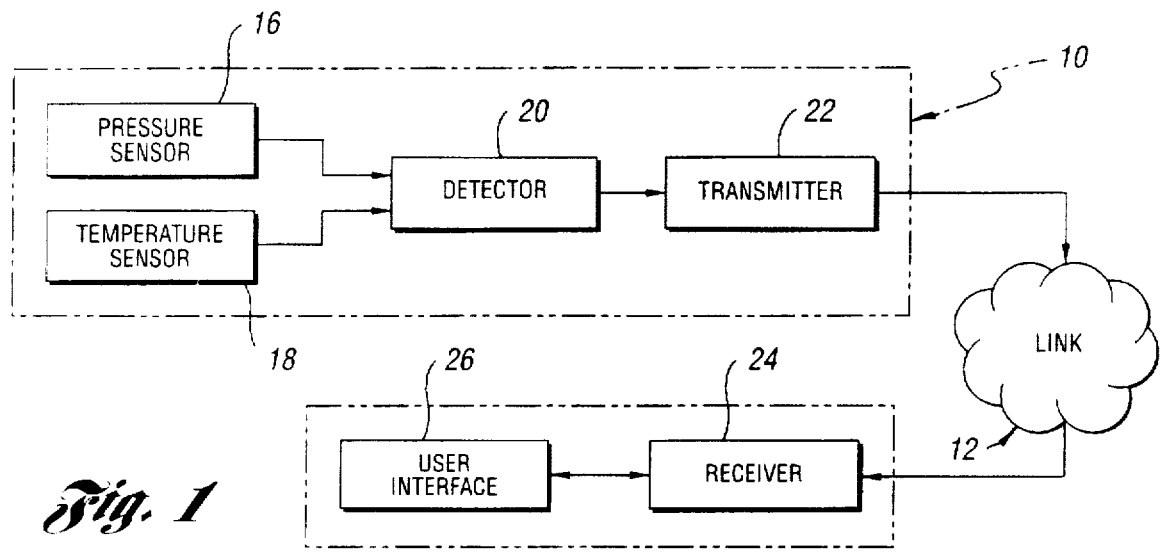
FIG. 1 presents a block diagram representation of the tire parameter monitoring system of one embodiment of the present invention.

Turning now to FIG. 1, a block diagram of one embodiment of the tire pressure monitoring system of the present invention is shown. In broadest terms, transmitter detector unit 10 monitors the pressure and temperature within a tire of a wheeled vehicle and transmits a signal representative of the pressure and temperature via link 12 to receiver user interface unit 14. Detector/transmitter unit 10 consists of a pressure sensor 16 and a temperature sensor 18 located in proximity to a tire so as to generate electrical signals corresponding to the tire pressure and temperature for input to detector 20. Detector 20 processes these electrical signals and communicates with transmitter 22 which broadcasts a signal representative of at least the pressure within the tire over link 12.

The user interface/receiver unit 14 consists of receiver unit 24 which accepts the electrical signal from transmitter 22 over link 12 and communicates with a user via user interface 26. In the preferred embodiment, the user interface 26 comprises an LCD display unit for displaying to the user the sensed pressure and/or temperature within the tire.

Figure 2:
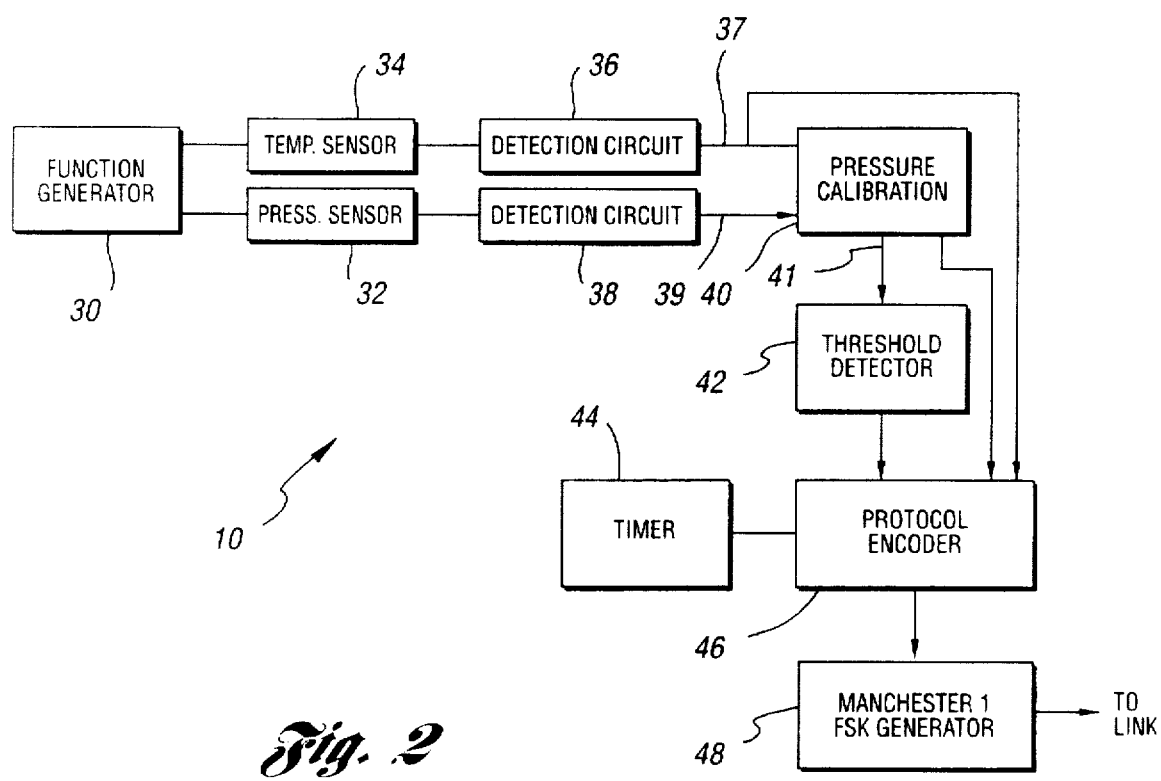
FIG. 2 presents a block diagram representation of the detector/transmitter unit of the tire pressure monitoring system of one embodiment of the present invention.

Turning now to FIG. 2, a more comprehensive block diagram of detector/transmitter unit 10 is presented. Temperature sensor 34 and pressure sensor 32 are driven by function generator 30 which emits a periodic signal to each sensor. Sensors 32 and 34 are designed to vary a parameter of the periodic signal generated by function generator 30 such as the amplitude, phase, frequency, or rate of decay, as a function of the sensed variable, either temperature or pressure. Corresponding detection circuits 36 and 38 are designed to detect the variation in the corresponding parameter and yield an output 37 which is proportional to temperature in the case of detection circuit 36 and yield an output 39 which is proportional to pressure in the case of detection circuit 38.

Pressure signal 39 and temperature signal 37 are input to pressure calibration unit 40 which corrects the pressure signal based upon the sensed temperature. Temperature 37 is also fed to protocol encoder 46. The pressure 41 determined by pressure calibration unit 40 is fed to threshold detector 42 which compares this pressure to one or more selected thresholds to determine if the pressure is in an appropriate operating range. In the preferred embodiment, the pressure is compared with an ideal pressure reading to determine if it is within plus or minus three pounds per square inch of that ideal pressure. If the sensed pressure does not fall within this range, an indication signal is sent to protocol encoder 46.

Protocol encoder 46 operates to take the sensed information, and whether or not the pressure violates one or more selected thresholds, convert this information to binary bits, and prepare a block of data to be transmitted consistent with an established protocol. This protocol could be virtually any existing block communications protocol or other means for performing asynchronous communication.

The individual binary bits generated by protocol encoder 46 are sent to Manchester/FSK generator 48. This unit converts these sequential bits of information into bi-phase level baseband transmission waveforms which are modulated using frequency shift keying (FSK). This encoded signal could be then modulated using a carrier frequency for radio frequency transmission. In the preferred embodiment, a traditional carrier frequency in the range of 400 KHz is used. However, a frequency-hop spread spectrum scheme could be used in this regard. One with ordinary skill in the art will recognize that a wide array of options exist for implementing this communication. The present invention should be broadly constructed to encompass the possible choices of waveform encoding, modulation scheme and communication protocol.

Figure 3:
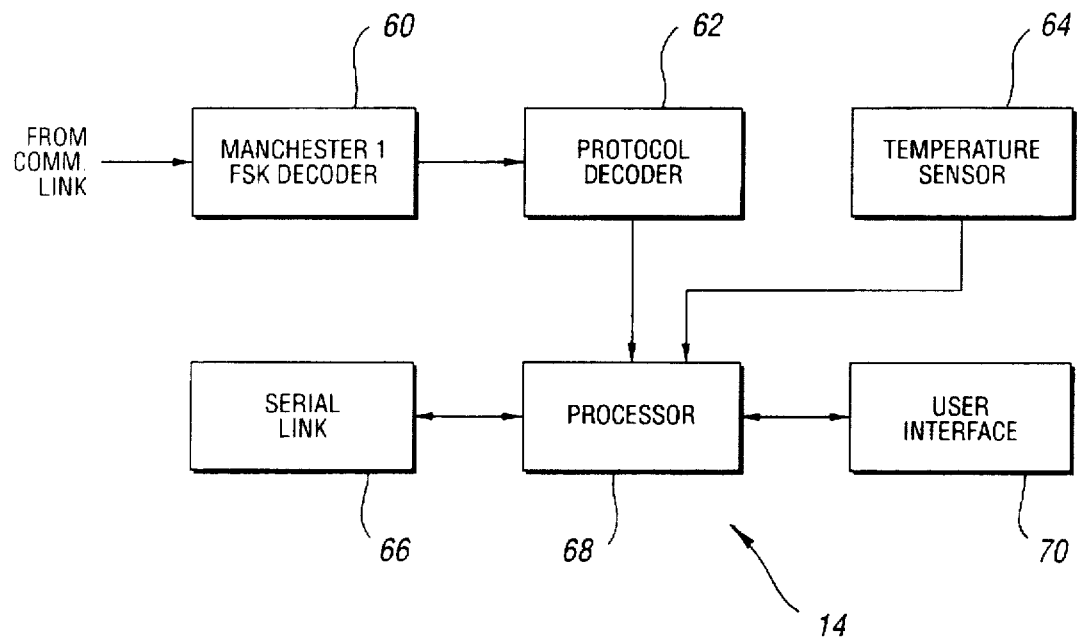
FIG. 3 presents a block diagram representation of one embodiment of the receiver/user interface unit of the tire pressure monitoring system of the present invention.

Turning now to FIG. 3, a block diagram representation of the receiver and user interface unit 14 is presented. The encoded data signal from the communication link is received by Manchester/FSK decoder 60. This decoder serves to convert the modulated and decoded wave forms into binary bits which are transferred to protocol decoder 62. Protocol decoder 62 strips the underlying databytes from the communicated signal and transfers these bytes as well as other indications provided by the protocol to processor 68. In addition to receiving data and indications from the communication link, processor 68 is also connectably in communication with optional serial link 66 such as an RS-232, RS-432 or other similar serial communication standard. This link provides an alternate source of programming and data communication with the processor.

User interface 70 communicates with the processor to receive user input and provide output to the user in the form of displays and indications regarding the operation of the tire pressure monitoring unit. Options for this interface could include voice-activated circuitry providing an audio input/output capability, a bar codes scanner and/or a keypad and display device.

Temperature sensor 64 provides an input to processor 68. In the preferred embodiment, temperature sensor 64 would be placed in a position so as to provide an ambient temperature reading which can be compared with the temperature reading from one or more tires so as to provide a differential temperature sensing capability.

Figure 4:
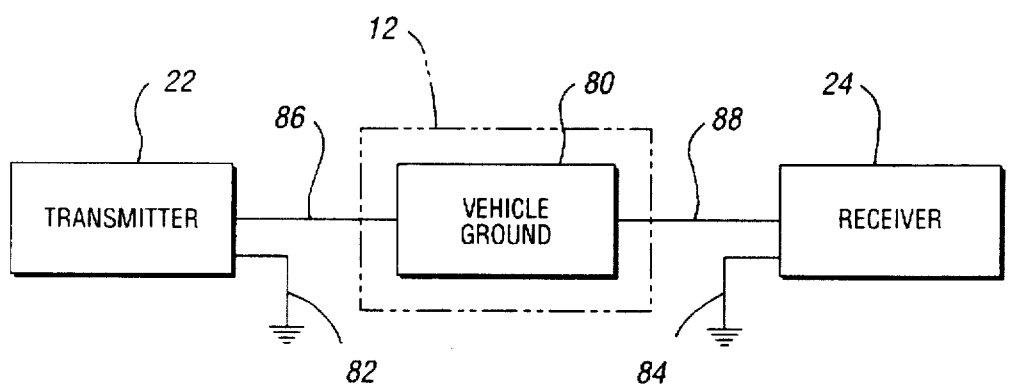
FIG. 4 presents a block diagram representation of one embodiment of the communication link used in the tire pressure monitoring system of the present invention.

Turning now to FIG. 4, a block diagram representing the receiver, transmitter and communication link are presented. In the preferred embodiment of the present invention, communication link 12 is implemented via the components of the vehicle which constitute electrical ground for the vehicle battery and other electrical systems. Transmitter 22 has signal output 86 referenced to ground 82 isolated from vehicle ground 80. This signal output 86 is connected to vehicle ground 80 which in turn is connected to signal input 88 of receiver 24. Receiver 24 in turn is provided a ground 84 which is also isolated from vehicle ground 80.

In one embodiment of the present invention, vehicle ground 80 comprises such elements as a metallic wheel on which a tire is mounted, the wheel bearings and axle, as well as the axle supports and vehicle frame. In effect, these components, their connections, and/or any gaps between these components, provide an electromagnetic path for which a signal can travel from transmitter 22 to receiver 24. In effect, the receiver and transmitter operate from a common antenna which comprises the vehicle ground. Experimental results indicate that this approach is both a viable and effective method for transferring signals in the 100 KHz to 1 GHz carrier range between transmitter 22 and receiver 24.

In the preferred embodiment, this conductive path would include a vehicle wheel, the wheel bearings and at least one stationary conductive component of the vehicle such as a vehicle axle or the like. By this means, the rotating transmitter/detector unit can communicate a signal to a stationary portion of the vehicle for either direct or remote detection by the receiver/user interface unit.

Figure 15:
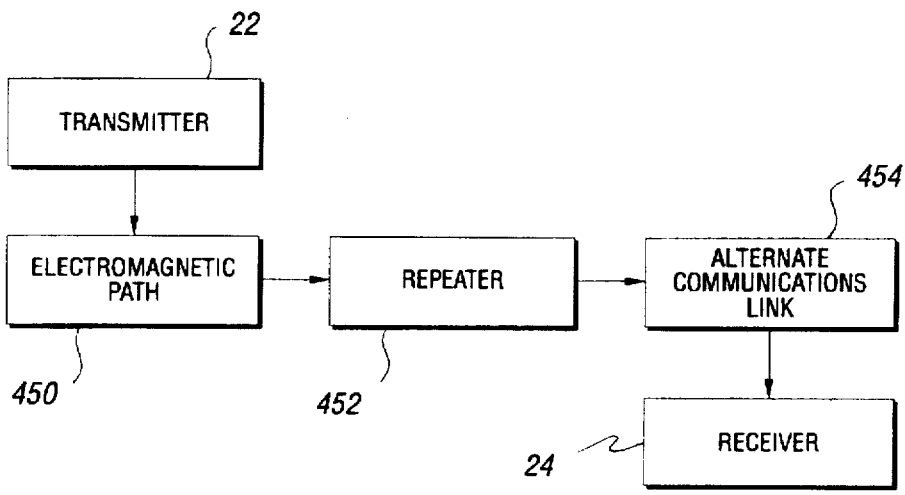
FIG. 15 presents a block diagram representation of the overall communications path of one embodiment of the present invention.

As shown in FIG. 15, in an alternative embodiment of the present invention, a signal repeater 452 receives a transmitter signal from transmitter 22 via electromagnetic path 450. Repeater 452, in turn, retransmits the transmitter signal to receiver 24 via alternative communications link 454. This alternative communications link could be an RF link, a fiber optic link or a direct connection. Further, the repeater 452 could simply amplify the incoming signal before retransmission, or it could decode the signal before retransmission in the same or in a different format. In addition, the repeater 452 could add an identification signal to the communication to identify the repeater or the tire which was the source of the communication.

Figure 16:
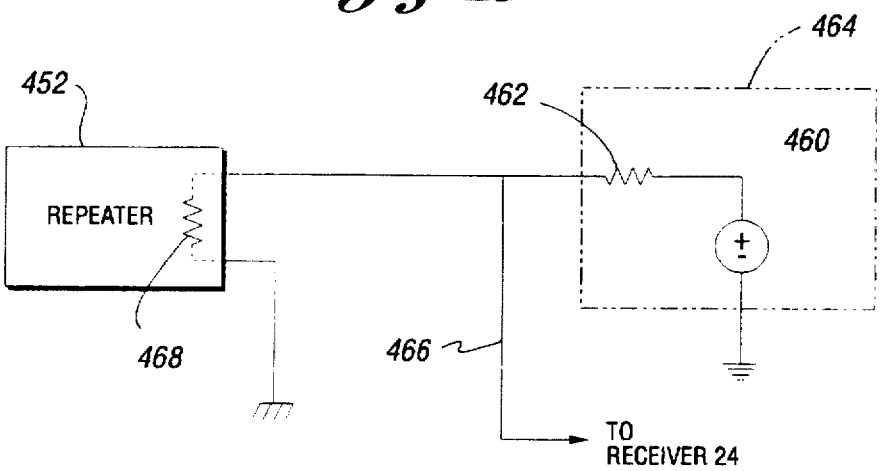
FIG. 16 presents a schematic representation of the connection of a repeater of one embodiment of the present invention.

In the one embodiment, the repeater 452 decodes the digital data from the transmitter 22 and retransmits the data to the receiver 24 in a trinary format as follows. Turning now to FIG. 16, the repeater unit 452 is connected to a source of voltage 460, such as a 12 volt vehicle battery, through a current limiting element, such as resistor 462. In effect, repeater 452 provides a load 468 on non-ideal voltage supply 464. By varying load 468, the repeater 452 can, in turn, vary the voltage 466 to multiple levels such as 12 volts, 9 volts and 6 volts used in the trinary scheme of one embodiment of the present invention. This trinary scheme is used to convey the data to receiver unit 24 which is provided with a suitable decoder, corresponding to the transmission scheme used. The repeater 452 is powered by regulating the voltage 466 down to a level, lower than the lowest level of the multiple voltage levels. The choice of the value of current limiting element or resistor 462 is thus based upon the power consumption of the repeater 452, the varying load values 468 and the magnitude of the supply voltage 460.

Thermistor 64 could optionally be located in, or in close proximity to, repeater 452. The temperature read by a decoding unit in the repeater could be sent to receiver 22 along with the data received from transmitter 24.

Figure 5A:
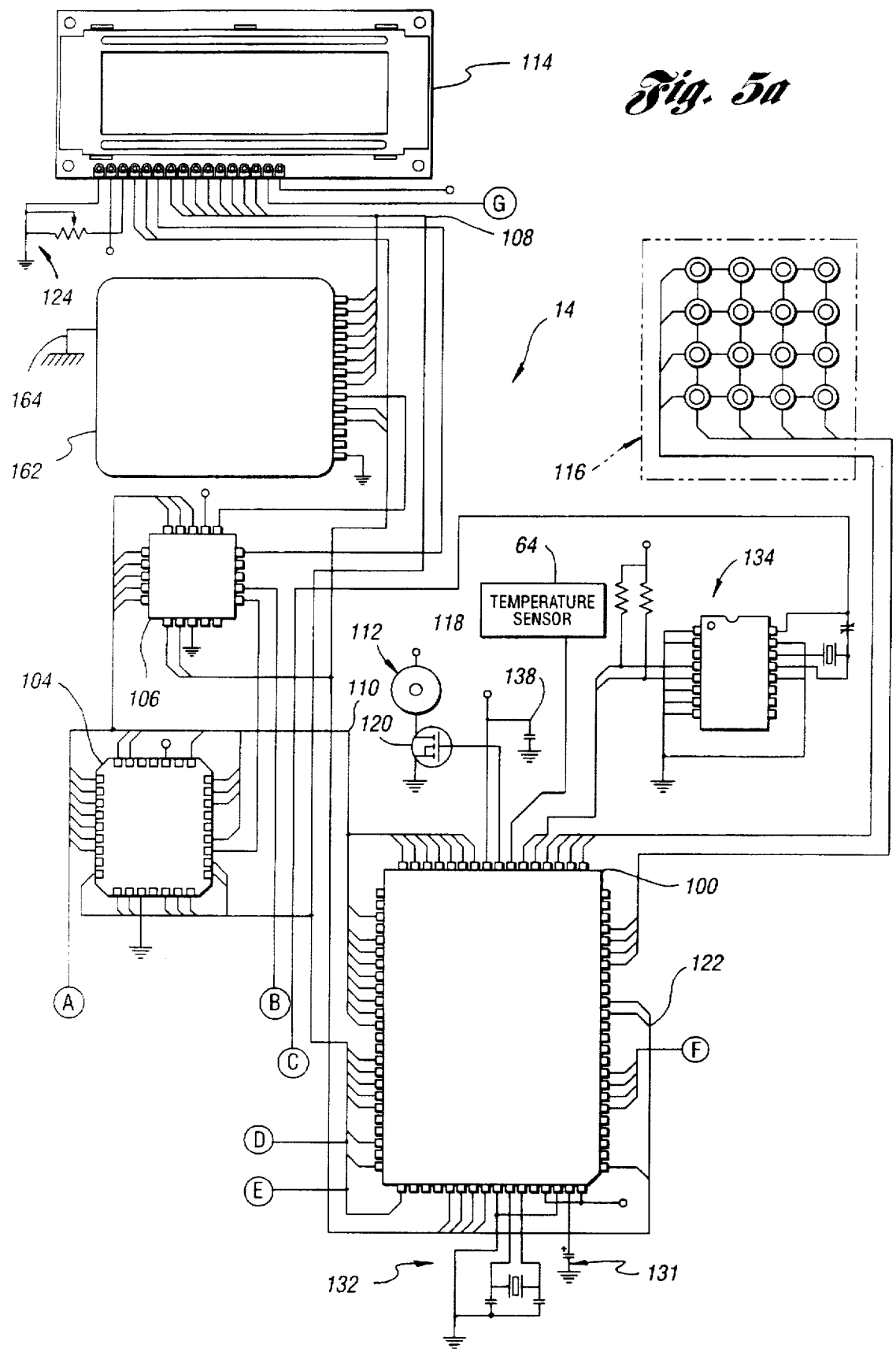
FIG. 5 presents a pictorial/schematic diagram of one embodiment of the receiver/user interface unit of the tire pressure monitoring system of the present invention.
Figure 5B:
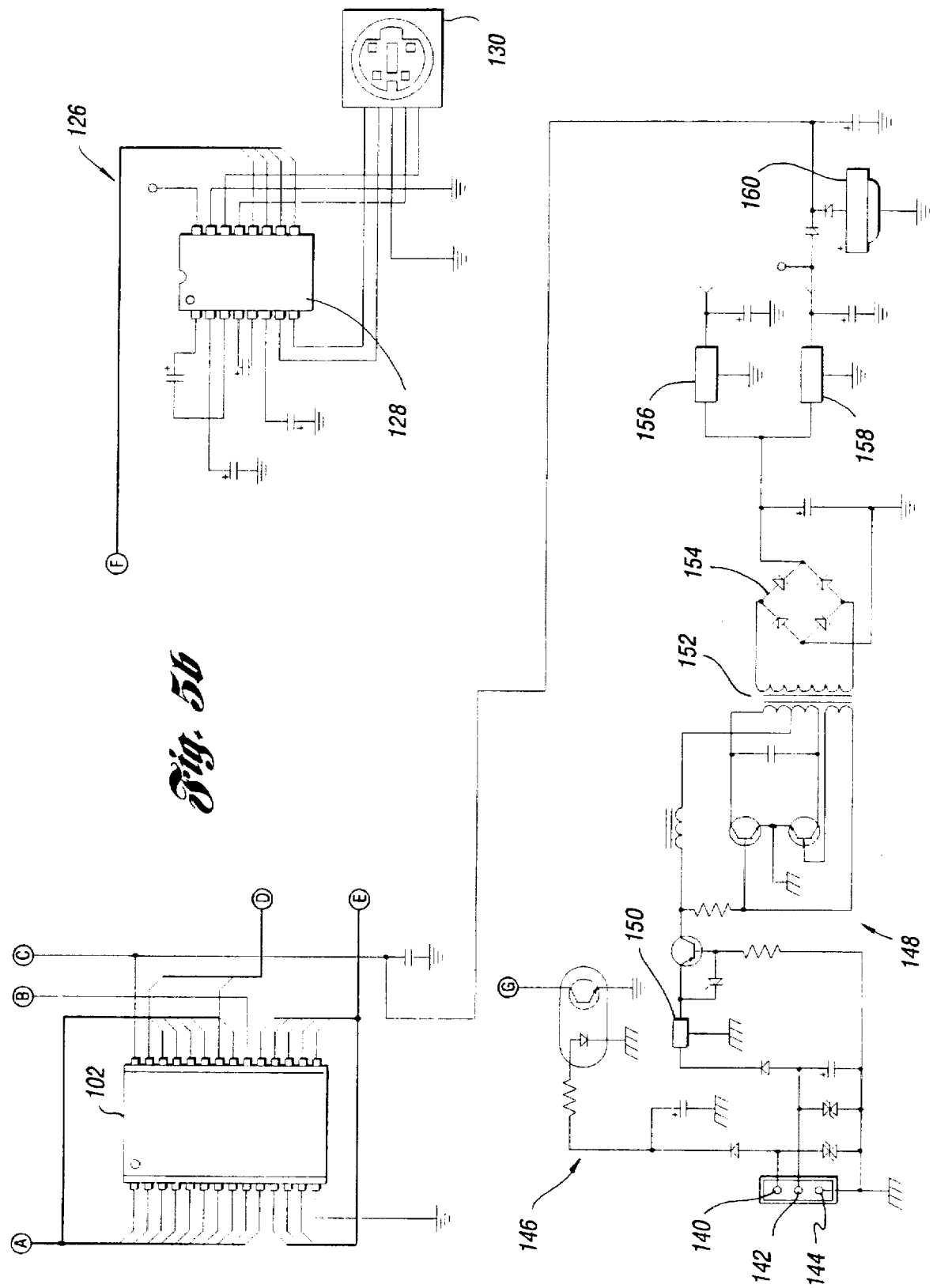

Turning now to FIG. 5, a schematic representation of the user interface/receiver unit 14 is presented. The heart of this unit is CMOS microprocessor unit 100. This microprocessor operates in conjunction with 32K RAM chip 102, 16K EPROM 104, address decoding chip 106, databus 108 and address bus 110. The microprocessor unit 100 is provided with an audio indicator and driver 112 consisting of buzzer 118 and MOS transistor 120. Microprocessor unit 100 is further provided with an LCD display 114 which is capable of displaying various letters, numbers, and symbols to a user.

LCD display 114 communicates with microprocessor unit 100 via databus 108 and control lines 122. Variable resistor 124 provides a brightness control for LCD display 114.

RS232 link driver 126 is also connected to microprocessor unit 100. This RS232 driver comprises transmitter/receiver unit 128 and RS232 DIN connector 130.

Microprocessor unit 100 further includes oscillator circuitry 132 for providing the clock signals which drive the microprocessor unit. Further, microprocessor unit 100 is provided with a second oscillator 134 which provides a clock for providing the calendar functions to the microprocessor.

Capacitor 130 connected to microprocessor unit 100 provides a power on reset function such that the operation of the microprocessor is initialized each time the unit is powered up. Capacitor 138 provides static discharge protection for the microprocessor which is advisable given that the microprocessor utilizes CMOS technology.

Terminal 140 is attached to a vehicle terminal which is a logic low voltage when the vehicle headlights are off and is a logic high voltage when the vehicle headlights are on. This high or low voltage is sensed by driver circuitry 146 which is connected to LCD display unit 114 so as to dim the display if the vehicle headlights are on.

Power for the unit is provided from the vehicle via vehicle ground 144 and vehicle battery terminal 142. Vehicle ground 144 and battery terminal 142 are fed to isolated self-oscillating power supply 148. Filter 150 provides protection against the emission of electromagnetic interference or more specifically radio frequency interference which could plague the operation of other components of the vehicle. Further, filter 150 filters the input signal to the power supply. Transformer 152 in conjunction with full wave bridge rectifier 144 and voltage regulators 156 and 158 provide a source of five-volt and nine-volt DC power which is isolated from vehicle ground 144. Lithium battery 160 provides a back up source of power in case the vehicle battery is disconnected.

In an alternative embodiment, bridge rectifier 144 could be coupled to vehicle power supply and ground by means of two separate series inductors (one for supply and one for ground). This configurably would provide an isolated ground terminal while filtering RF signals from the power supply.

Receiver and decoder module 162 provides the functions of Manchester/FSK decoder 60 from FIG. 3. Receiver and decoder 162 is connected to the vehicle ground 164 serving as the primary communication link between the transmitter unit and the receiver. Temperature sensor 64 is connected to microprocessor unit 100 to provide an ambient temperature measurement as described with reference to FIG. 3.

Figure 20A:
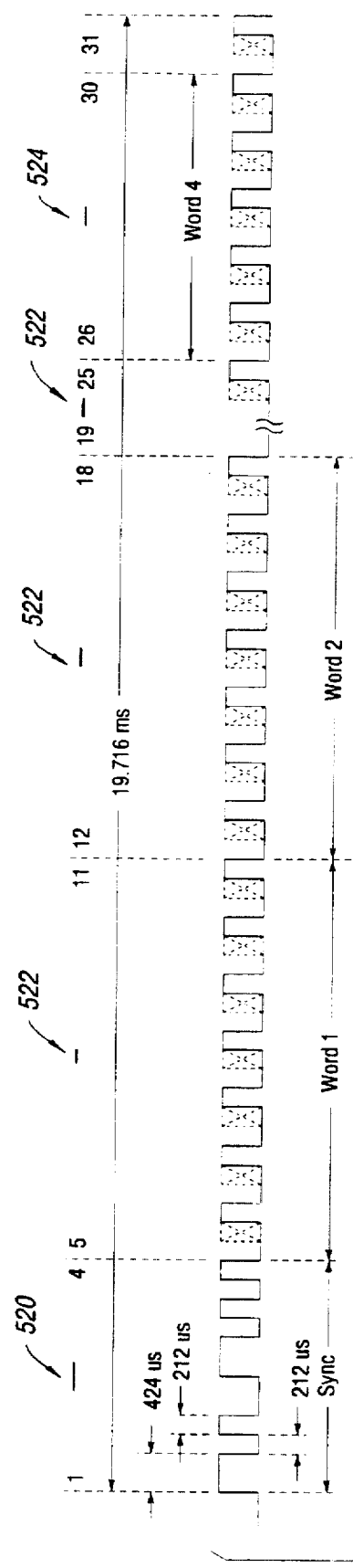
FIG. 20A presents the Manchester code format used for communication in one embodiment of the present invention.
Figure 20B:
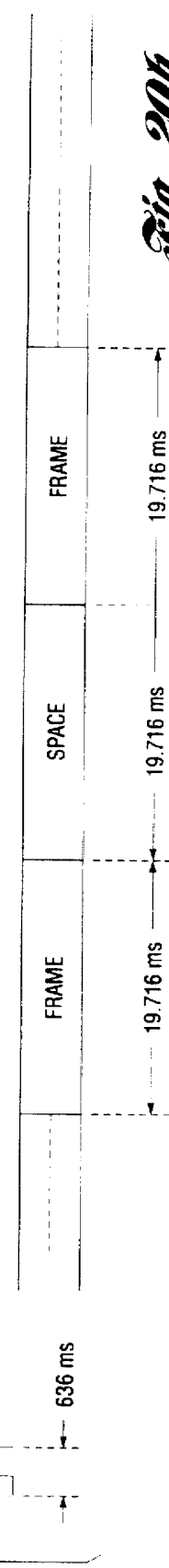
FIG. 20B presents the frame format used for communication in one embodiment of the present invention.

The Manchester code format utilized by one embodiment of the present invention is shown in FIGS. 20(a) and (b). Turning now to FIG. 20a, a data frame begins with a synchronization sequence 520 and is followed by three 7-bit words 522. These 7-bit words are followed by a 5-bit word 524 and a "more information" bit. Each data frame is followed by an equal interval of silence as shown in FIG. 20b.

Referring again to FIG. 20a, the 31 bits of the data frame are assigned as follows:

(a) Bits #1 through #4 are designated for use as frame synchronization bits that indicate the location of the first information bit, bit #5, through use of a Manchester coding violation in its #1 and #3 positions. Bit #1 is the first bit of the 31 bit frame that is transmitted.

(b) Bit #5 is the least significant bit (LSB) and is the first information bit transmitted. Bit #31 is the most significant bit (MSB) and is transmitted last within the 31 bit frame.

(c) Bits #5 through #30 are used for information bits and parity bits; these bits are parsed into 3 words of 6 information bits and 1 parity bit, and 1 word of 4 information bits with parity bit. The 6 LSB's of each word are designated identification information bits, while the MSB is designated an odd parity bit.

(d) Bit #31 is designated for use as a "more information" bit; when set to a "1" it indicates that a subsequent unique frame of information exists; this applies to transponders with memory capacities greater than 31 bits (59 bits, for example); a "0" is used in the final frame to indicate that all information frame have been received, and that the next frame will be Frame #1. A "0" is also employed in single frame applications to indicate that only one unique frame exists.

(e) All frames conform to this same frame architecture. Assignment of specific bits for applications could be performed as follows. For example, the 59 information bits could be parsed in the following application:

| Word 1 | Tire Number |
|---|---|
| Word 2 | Pressure |
| Word 3 | Temperature |
| Word 4 | Report Conditions |
| Words 5, 6 and 7 | Trailer Serial No. |

The allocation of the word-4 report conditions are as follows:

0000-Normal status

0001-Alarm status

1000-Program this tire to be left front tire

1001-Program this tire to be right front tire

1010-Program this tire to be right rear tire

1100-Program this tire to be left rear tire

The time reporting function could be used to indicate such functions as forthcoming reduced power mode of operation if a piezo-electric cell were used as a source of power with the optional capacitative storage, programming for additional tires, and further system checks and procedures.

Error detection is determined through parity checking and through redundant frame reading as follows.

(a) Error detection is determined through the use of Odd Parity in bit positions 11, 18, 25, 30. Each parity bit is associated with the 6 bits that comprise the word immediately preceding it. A valid word contains an odd number of logic "1's" when the number of occurrences within the 6 bit word and the parity value are summed.

(b) In order for a frame to be accepted as valid, all parity bits must be in agreement with the information bits contained in the associated word.

(c) In order for a read sequence to be accepted as valid, two consecutive valid frames must be read and must be identical.

Turning now to FIG. 6, a block diagram of the communications between a plurality of detector/transmitter units 10 and the receiver/user interface unit 114 is shown. In one embodiment of the present invention, each of the detector/transmitter units 10 correspond to a separate tire of a vehicle. In an alternate embodiment of the present invention, two or more detector/transmitter units 10 are present in at least one tire of the vehicle for the purposes of providing redundant operation. The communication between the various detector/transmitter units 10 and the receiver 14 is carried out asynchronously in the form of variable length packets of information. Eight bits of information in each data packet correspond to the sensed pressure and eight bits of information correspond to the sensed temperature.

In one embodiment of the present invention, the particular tire that is the source of the transmission is identified based upon the phase shift and the signal to noise ratio of the received signal. In an alternative embodiment of the present invention, the particular tire is identified by a tire identification pattern sent in the data packets corresponding to that tire.

In one embodiment of the present invention, each of the detector/transmitter units 10 are powered by a battery. In this application, pressure and transmitter data is transmitted from the detector/transmitter 10 to the receiver/user interface 14 at periodic intervals such as one minute or ten minutes. Each of the detector/transmitter units would be given a unique eight bit address corresponding to that particular unit. If a scheduled data transmission were not received from a particular unit after one or more periods of operation, the receiver/user interface unit 14 would detect a possible failure of that unit and could provide an indication to the user via the user interface. In one embodiment of the present invention, this unit failure could be conveyed to a vehicle alarm unit (if the vehicle were not moving) indicative of a possible tire theft in progress.

To supplement the periodic transmissions, in the event the sensed temperature or sensed pressure from a particular detector/transmitter unit 10 were beyond a certain range, for instance the pressure was beyond +3 or −3 psi from some nominal setting or the temperature were beyond some temperature threshold, a separate unscheduled data transmission would be initiated by the respective detector/transmitter unit 10 and conveyed to the receiver/user interface 14 indicating this fault. Further, this fault condition again could be relayed to the user via the user interface.

An alternate source of power for the detector/transmitter units 10 could be a piezo-electric element. As the tire rotates during operation of the vehicle, the piezo-electric element could vibrate generating power to the detector/transmitter. In one embodiment, the detector/transmitter unit would only send periodic transmissions while the vehicle were moving above a certain velocity. Further, the receiver/user interface 14 would only expect to receive these periodic transmissions when the vehicle velocity were above a certain threshold as sensed by a transducer connected to the speedometer of the vehicle or from a wheel speed sensor used in conjunction with an anti-lock braking system or in conjunction with a magnetic sensor connected to the vehicle drive shaft or the like.

One with ordinary skill in the art will recognize that there are further options for determining the speed of the vehicle. The present invention should be construed in light of these options. Similarly, when the vehicle is in motion and the detector/transmitter units 10 are powered, if the sensed temperature or sensed pressure violate certain preset conditions, an unscheduled transmission would be initiated from that respective detector/transmitter unit to the receiver/user interface unit 14 as in the application where the detector/transmitter unit 10 is powered by a battery.

In an alternative embodiment of the present invention, the piezo-electrical element could be provided with a capacitive storage element. This capacitive storage element could provide sufficient power to provide power to the sensor for some period of time, possibly seven days or more, while the wheel is not moving. The sensor/transmitter unit would then operate in a power saving mode, such mode communicated to the receiver unit. During this mode, the transmitter 22 would be activated less frequently to avoid excessive drain on the capacitive storage and to provide longer operation while the wheel is stationary.

Turning now to FIG. 7, a combination schematic/block diagram of a detector/transmitter unit 10 is presented. A detector processor logic array 200 is shown as a series of functional sub-blocks 212 through 236. This processor unit 200 is powered alternately by battery 201 connected to voltage regulator/voltage transient protector 212 or by piezo-electric battery eliminator 202. This piezo-electric battery eliminator 202 consists of a piezo-electric element 204 which is connected to weighted arm 206. During operation of the vehicle, the tire of the vehicle on which the detector/transmitter unit is mounted spins, causing motion and vibration which in turn causes motion in weighted arm 206. This excites piezo-electric element 204 which generates power to bridge rectifier 208. The signal from bridge rectifier 208 is in turn filtered by capacitor 210 before it is fed to voltage regulator/voltage transient protector 212. Capacitor 210 further provides storage of accumulated charge for operation when the tire is no longer in motion.

Induction coil 244 is placed so as to provide an inductively coupled communication link between induction coil 244 and a separate, remotely place coil. This inductive link provides a source of communication between the detector/transmitter unit 10 and a remote controller for remote controlling and monitoring of the unit. This inductive link 242 is connected to service detector 222 of processor 200 via voltage doubling diodes 241.

Figure 19:
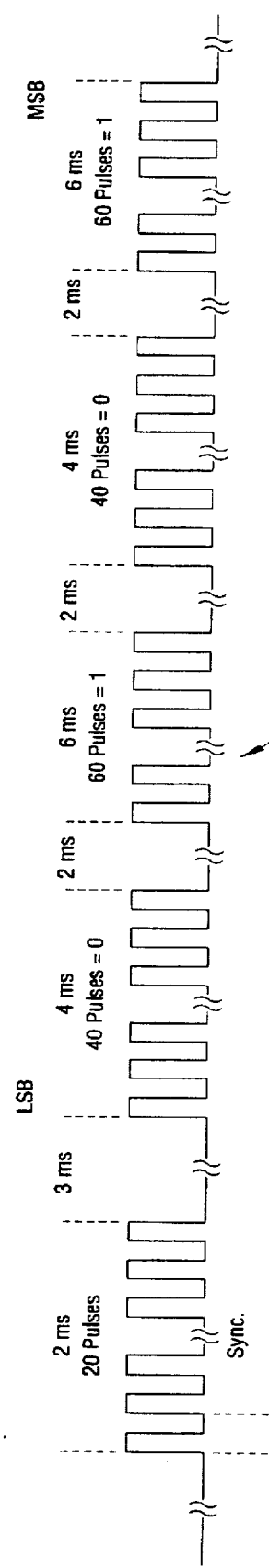
FIG. 19 presents a representation of the pulsetrain used for communication in one embodiment of the present invention.

In the preferred embodiment, this inductive link is operated at carrier frequency of 400 KHz with a CW modulation scheme with a pulse rate of 10K pulses/sec. A sample baseband waveform 500 is shown in FIG. 19. Twenty pulses followed by 3 msec of silence provide synchronization. Four bits of information are transmitted LSB to MSB where a binary "0" is represented by 40 pulses followed by 2 ms of silence and a binary "1" is represented by 60 pulses followed by 2 ms of silence.

Referring again to FIG. 7, processor 200 further comprises programmable logic array 226 EPROM 228 and clock oscillator circuitry 224 connected to external clock circuitry 246. Manchester code generator 232, service code identifier 234, ID code identifier 236 and FSK generator 230 generate the transmitted wave form to be sent over the communications link. As shown in the preferred embodiment in FIG. 7, FSK generator 230 is connected via resonant impedance matching network 238 to vehicle ground 240.

Processor 200 further comprises analog to digital converters 216, 218 and 220. Thermistors 258 and 254 in conjunction with capacitors 256 and 252 are configured so as to provide an R-C time constant which varies with temperature. When thermistor 258 and capacitor 256 are given a step input of voltage, the rate of increase of voltage on line 257 is read by A to D converter 216 as a function of the resistance of thermistor 258 and thus a function of the temperature of thermistor 258. Optionally, A to D converter 218 reads the voltage on line 253 which is a function of the temperature of thermistor 254.

Pressure within a tire is determined based upon a similar RC circuit comprising resistor 250 and capacitive pressure transducer 248. When a step voltage input is applied to this RC network, the rate of increase of the voltage on line 249, as read by A to D converter 220, will be a function of the capacitance of capacitive pressure transducer 248 and thus a function of the pressure to which it is exposed.

One with ordinary skill in the art will recognize that a wide variety of different pressure transducers and driving circuits could be used. The present options are for illustrative purposes and are not intended to limit the scope of the invention.

Figure 8:
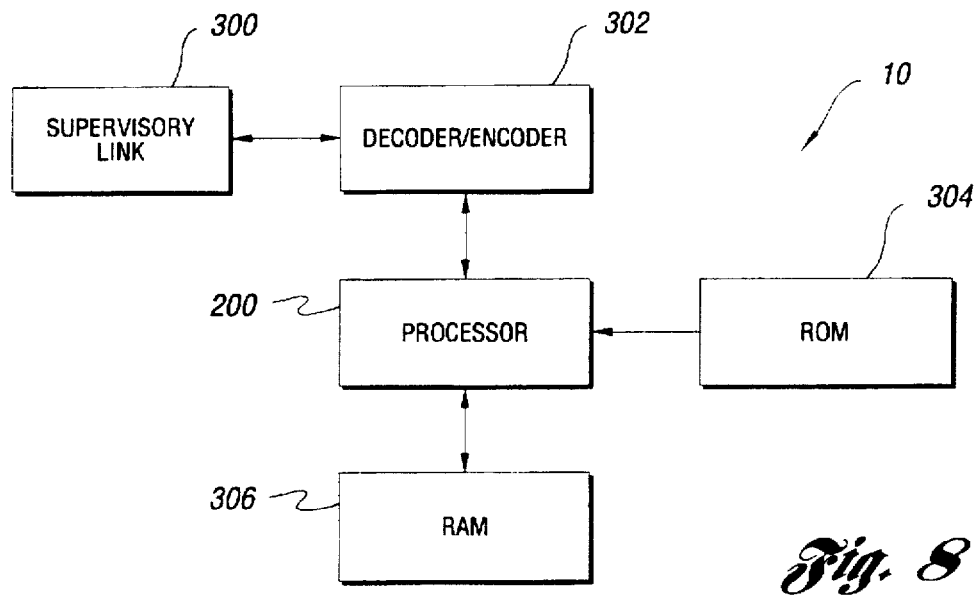
FIG. 8 presents a block diagram of the supervisory link interface for the detector/transmitter of one embodiment of the present invention.

Turning now to FIG. 8, a block diagram of the supervisory feature of the detector/transmitter unit 10 of the present invention is shown. Detector processor 200 is connected to detector ROM 304 and detector RAM 306. Further, the processor 200 communicates with a remote control device shown over supervisory link 300 via decoder/encoder 302. In the preferred embodiment, supervisory link 300 is implemented by the inductive link described in conjunction with FIG. 7. Unique 4-bit patterns initiate the functions of dumping and storing various system parameters including the tire number, transmitter unit ID number, and also including the various pressure and temperature thresholds and nominal values, if applicable. Further, remote control via the supervisory link may allow the user to change the controller configuration, for example, switch the processor from receiving inputs from one A to D converter to another. In addition, by remote control a test program could be initiated for determining whether or not the sensor or alternately the battery is operating properly.

Moreover, via remote control the user could dump the system ROM or RAM or alternately store additional data in the system RAM. In addition, the remote user could dump additional system information including the vehicle number, the serial number, the production date of the software in the ROM or other system information.

Figure 9A:
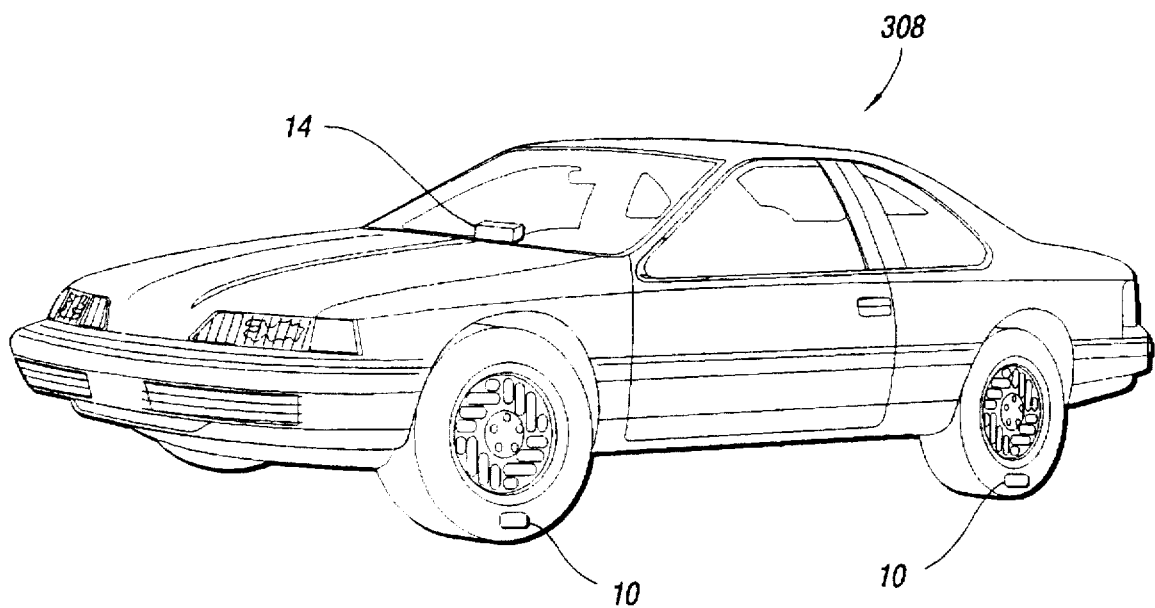
FIG. 9A presents the use of the tire pressure monitoring system of one embodiment of the present invention in conjunction with a vehicle.

Turning now to FIG. 9A, a diagram showing an object of the present invention is shown. Vehicle 308 is provided with a receiver/user interface unit 14 which communicates with individual tire parameter detector/transmitter units 10 located within each of the tires.

Figure 9B:
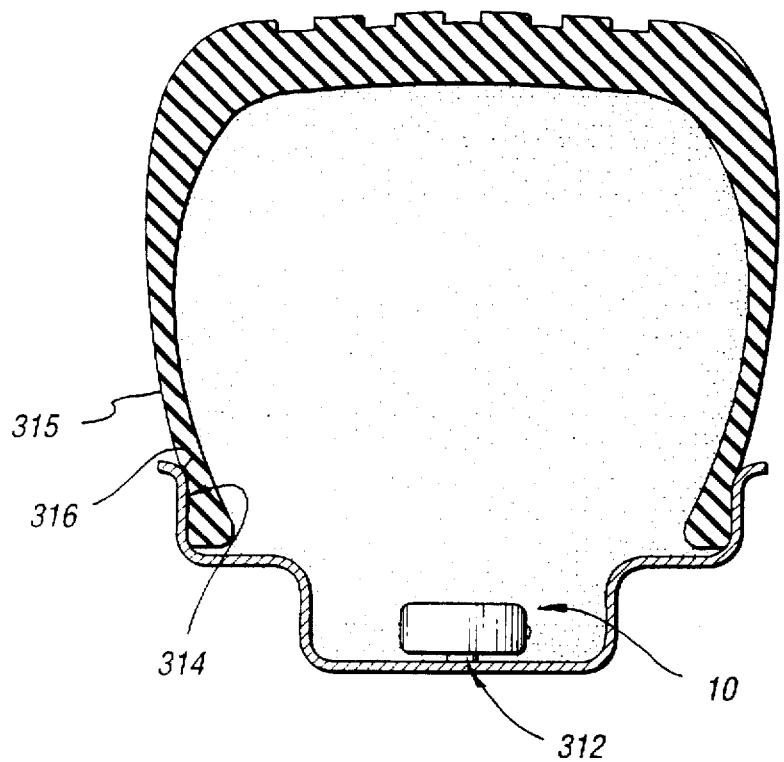
FIG. 9B presents a representation of the location of the detector/transmitter unit within a wheel of one embodiment of the present invention.
Figure 9C:
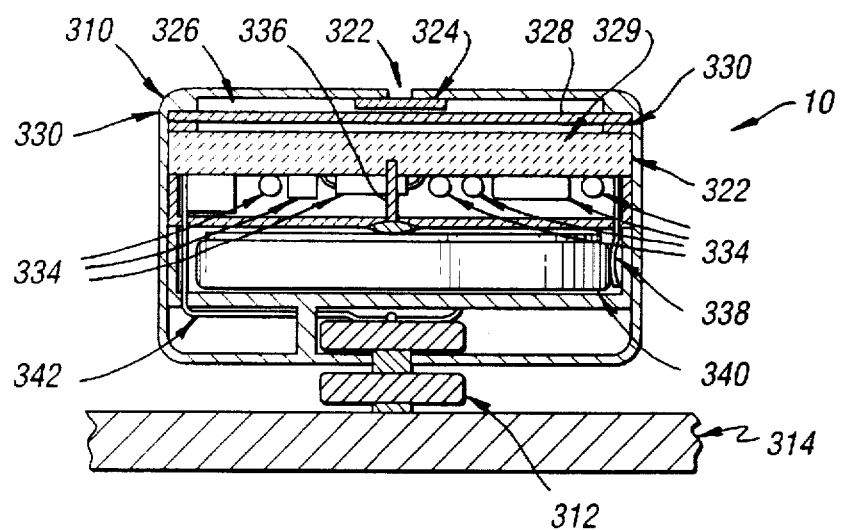
FIG. 9C presents a vertical cross-section of one embodiment of the detector/transmitter unit of the tire parameter monitoring system of the present invention.

Turning now to FIG. 9C, a vertical cross section of the detector/transmitter unit 10 of one embodiment of the present invention is shown. This unit is housed in phenolic casing 310 attached to stud rivet 312 which is spot welded to the interior wheel rim wall 314 of a vehicle.

Figure 9D:
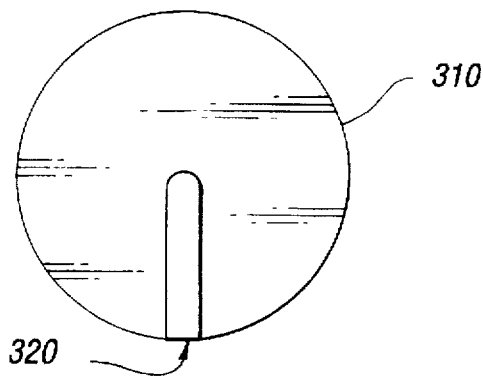
FIG. 9D presents a bottom view of one embodiment of the detector/transmitter unit of the tire parameter monitoring system of the present invention.
Figure 9E:
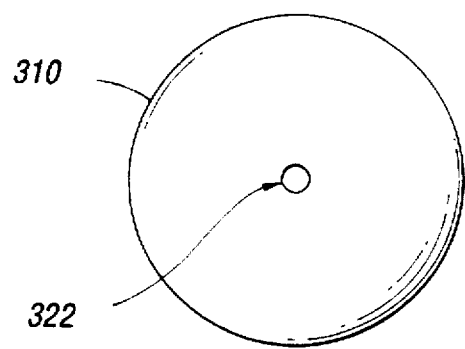
FIG. 9E presents a top view of one embodiment of the detector/transmitter unit of the tire parameter monitoring unit of the present invention.
Figure 9F:
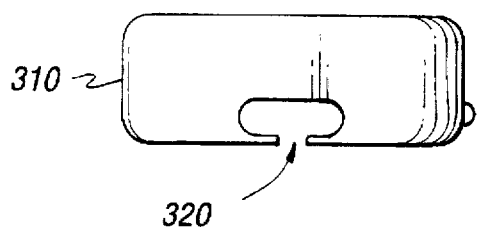
FIG. 9F presents a side view of one embodiment of the detector/transmitter unit of the tire parameter monitoring system of the present invention.
Figure 9G:
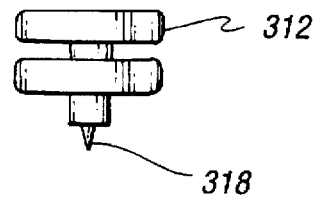
FIG. 9G presents a side view of a stud rivet for mounting a detector/transmitter unit to a wheel in one embodiment of the tire parameter monitoring system of the present invention.

FIG. 9B presents a more global view of detector/transmitter unit 10 as is connected to wheel rim wall 314 via stud rivet 312. Lips 316 of wheel rim wall 314 are provided for accepting a tire 315. Rivet 312 is provided with point 318 as shown in FIG. 9A to aid in the penetration welding of the stud rivet 312 to the wheel rim wall 314. The bottom of phenolic casing 310 is provided with slot 320 for accepting stud rivet 312 as shown in FIG. 9D and FIG. 9F. The top of phenolic casing 310 provides an access hole 322 as shown in FIG. 9E for allowing the admission of pressurized gas within the tire. The pressurized gas is filtered by filter 324 before admittance to chamber 326. Chamber 326 is enclosed by capacitive plate 328 which flexes in response to the pressure of the admitted gas. This capacitive plate 328 is supported by spacers 330 above ceramic substrate 332 on which is deposited a conductive coating supplying second capacitive plate 329. This ceramic substrate also supports components 334 which make up the circuitry of detector/transmitter unit.

In this embodiment of the present invention detector 10 is powered by battery 340 which is connected to circuitry 334 via pin 336 in battery connector 338. Antenna connection 342 from the transmitter circuit is conductively attached to stud rivet 312 for conduction with the electromagnetic path.

Figure 17:
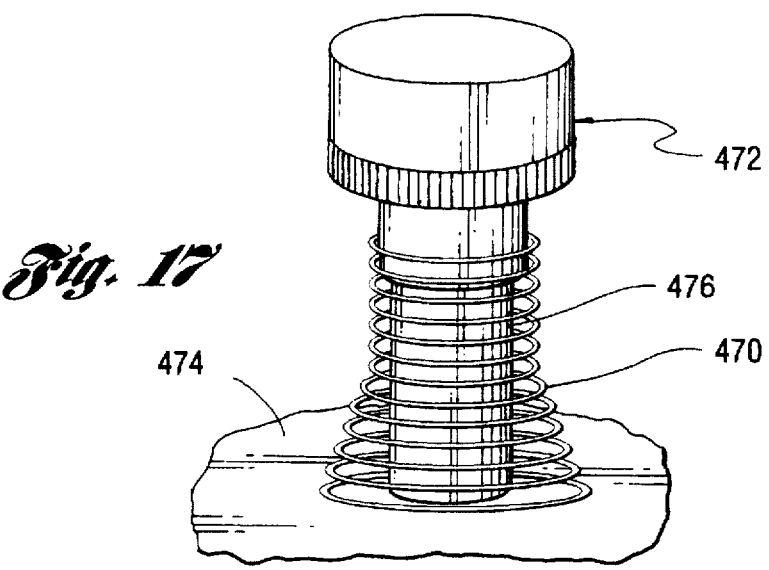
FIG. 17 presents a perspective view of the transmitter/detector unit of one embodiment of the present invention.

Turning now to FIG. 17, a further embodiment of the present invention is shown. Detector/transmitter 10 is located within the valve cap 472 for the tire stem 476. The cap 472 could be in electromagnetic communication with the wheel rim 474 via spring 470. Alternatively, this cap 472 could be in electromagnetic communication with the wheel rim via a special conductive rubber tire stem. In this case, spring 470 could be eliminated.

Figure 10:
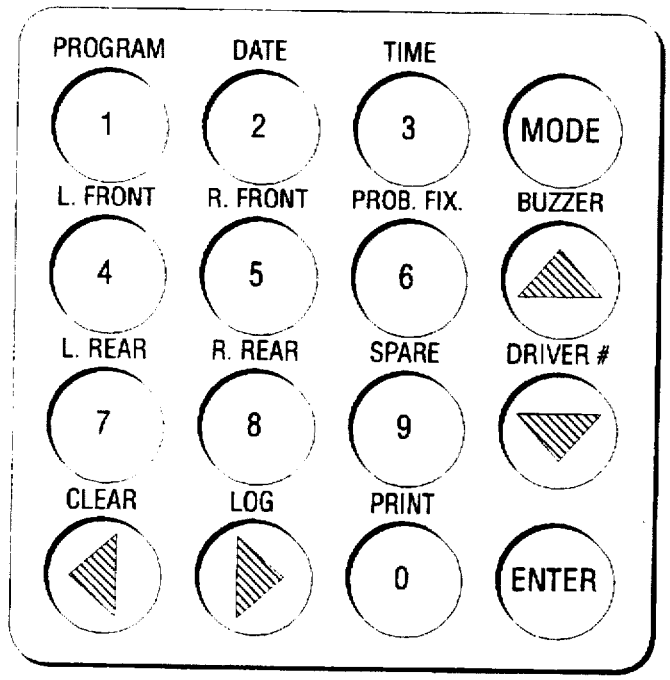
FIG. 10 presents a pictorial lay out of the matrix keypad for the user interface of one embodiment of the tire parameter monitoring system of the present invention.

Turning now to FIG. 10, the matrix key pad 116 from FIG. 5 is shown in more detail. The functions of the key pad are described in detail with respect to FIGS. 14A–F.

FIG. 11 presents the various control commands to be used in conjunction with the RS232 interface of the receiver/user interface unit 14 presented in FIG. 5. Before any command can be issued to the receiver/user interface unit 14, a capital V must be sent followed by the eight character password followed by a carriage return.

A capital C followed by a carriage return denotes a command which initiates the receiver/user interface unit to reply with the software version and serial number. A capital D followed by 24 additional characters and a carriage return instructs the receiver/user interface unit 14 to program the 24 character data string represented by small d's in FIG. 11 as the vehicle identification code such as the VIN number used in North American automobiles.

If a capital I is sent followed by a data file followed by a carriage return, the data file is transferred to the receiver/user interface unit 14 which contains the addresses and labels for up to 256 tires. If a capital L is sent followed by a two number combination BB followed by a comma and followed by a second two number combination EE and a carriage return, the receiver/user interface responds by listing all of the tire alarms, meaning each of the alarm conditions which occurred from month BB to month EE.

If a capital N is sent followed by eight characters followed by a carriage return, the receiver/user interface 14 responds by storing the eight characters represented by lower case d's as the password for the system. This password serves as a security check for the RS232 link such that only authorized users may access the control commands presented herein.

If a capital O followed by a carriage return is sent, this initiates the receiver/user interface unit 14 to output all stored events including all alarm conditions and their dates. Further, the receiver/user interface unit 14 is instructed to reset its memory of all events.

If a capital P is sent followed by a 1 followed by a two digit number MM followed by a comma followed by a two digit number DD followed by a comma followed by a two digit number YY followed by a carriage return, the receiver/user interface unit 14 programs a new date wherein the two digit number MM is the month, the two digit number DD is the day and the two digit number YY is the year.

If a capital P followed by a 2 followed by a two digit number HH followed by a comma followed by a two digit number MM followed by a carriage return is sent, then the receiver/user interface unit 14 is initiated to enter a programmed time wherein the two digit number HH represents the hour and the two digit number MM represents the minute.

If a capital P followed by a 3 followed by a three digit number WWW followed by a comma followed by sixteen characters represented by lower case d's in FIG. 11 followed by a carriage return is sent, then the receiver/user interface unit 14 is instructed to program a particular tire number and label wherein the first eight characters represented by a lower case d are the tire number and wherein the last eight characters represented by a lower case d are the label.

If a capital R followed by a carriage return is sent, the receiver/user interface unit 14 is instructed to output all events that have occurred that are stored in memory without resetting the memory.

If a capital T is sent followed by a number 1 through 5 followed by a carriage return is sent, then the receiver/user interface unit 14 is instructed to output the time and date if the number sent is 1, is instructed to output all tires and labels if the number sent is 2, is instructed to output the vehicle ID number if the number sent is 3, is instructed to output the log number if the number sent is 4, and is instructed to output the driver number if the number sent is 5.

Figure 12C:
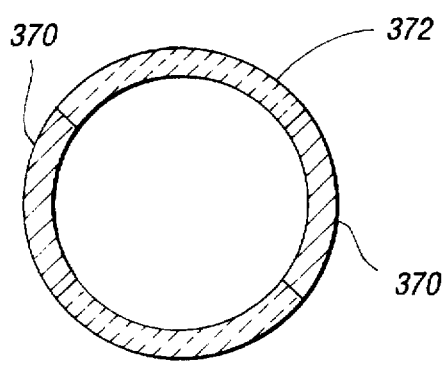
FIG. 12C presents a bottom view of the annular lip of the plastic retainer for the pressure monitor used in one embodiment of the tire parameter monitoring system of the present invention.

Turning now to FIG. 12, an alternate pressure sensing device which operates based upon piezo-resistance is presented. A vertical cross section of the piezo-resistive pressure sensor is shown in FIG. 12A. Piezo-resistive layer 360 is supported by diaphragm 362. Diaphragm 362 is constructed of silicon liquid crystal polymer or any temperature stable flexible plastic which operates over an automotive temperature range. Diaphragm 362 is in turn supported by plastic retainer 364 which has a pressure inlet 366. This pressure inlet allows the admission of pressurized gas which in turn deforms diaphragm 362 causing the expansion of the surface of piezo-resistive layer 360.

Figure 12B:
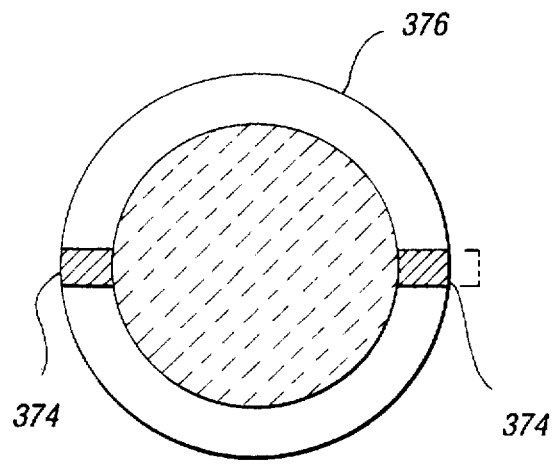
FIG. 12B presents a vertical cross section of the contact pin/brass contact configuration of the pressure monitor of one embodiment of the present invention.
Figure 12E:
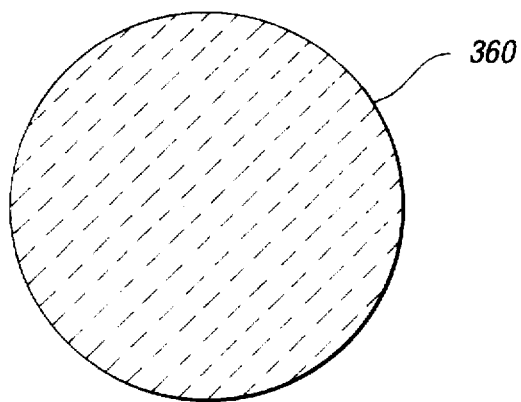
FIG. 12E presents the piezo-resistive element of the pressure sensor used with one embodiment of the tire parameter monitoring system of the present invention.

Electrical contact to piezo-resistive layer 360 is made in conjunction with contact pins 368. These contact pins 368 are supported by plastic retainer 364 and are electrically coupled to brass contact 370 as shown in FIG. 12B. These brass contacts are diametrically spaced about annular lip 372 of plastic retainer 364. These brass contacts in turn are in electrical contact with silver contacts 374 which are mounted diametrically on diaphragm 362. As shown in FIG. 12 or alternatively, the brass contacts 370 are in direct electrical contact with the piezo-resistive layer 360 as shown in FIG. 12E. Piezo-resistive layer 360 is constructed of 20% molybdenum disulfide, 40% activated N-type semiconductor and 40% alkyd or silicon binder.

Figure 13:
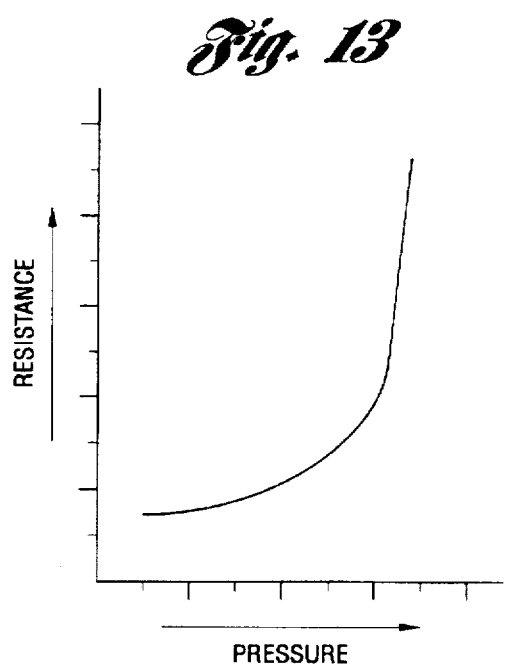
FIG. 13 presents the pressure-resistance characteristic of the piezo-resistive pressure sensor used in one embodiment of the tire parameter monitoring system of the present invention.

In operation, the increase of pressure at pressure inlet 366 causes an increase in resistance of the piezo-resistive layer as sensed between contact pins 368 as shown in FIG. 13. In operation, this resistance can be measured in a variety of ways known to those of ordinary skill in the art and converted into pressure by a linear offset and scaling constant if operated over a sufficiently small range of pressures. Alternatively, the resistance as a function of pressure can be stored in a look-up table format for proper calibration, and a given value of resistance can then be equated with its corresponding pressure based upon this calibration curve.

The programming of the receiver/user interface unit 14 by means of the matrix keyboard unit 116 shown in FIG. 10 as well as the operation of the LCD display unit 114 is illustrated by FIGS. 14A through 14F. When the power is turned on to the vehicle, display one as shown in block 400 is shown on LCD display unit 114. This display 400 presents the model number of the tire pressure monitoring system as well as the version of the software. If this is the first time that the unit has been turned on, meaning that the unit has not been previously programmed, then the unit waits for five seconds as shown on block 404 and proceeds to display two as shown in block 406. If, however, the unit has previously been programmed either by user input or automatically by the system, the software proceeds to point W 402 in FIG. 14D.

Display two in block 406 prompts the user to enter the date. The user then enters the date numerically using the numbers of the keypad shown in FIG. 10 followed by the enter key as shown in block 408.

The system then responds by presenting display three as shown in block 410. Display three prompts the user to enter the time. The user then enters the time, again using the numeric keys of the keypad shown in FIG. 10 followed by the enter key as shown in block 412. The system then responds by presenting display four as shown in block 414 of FIG. 14B.

Display four prompts the user to program the tires or to press enter. If the enter key is not pressed after five seconds as shown in block 416, the system responds by presenting display five as shown in block 418. If, however, the enter key is pressed within the five second interval, the system responds by going to point W as shown in step 420 which corresponds with a similarly denoted point in FIG. 14D.

Display five prompts the user to enter the number of tires to program as shown in block 418 at which point the user enters a number between 1 and 256 as shown in block 422 followed by the enter key. The system then responds by presenting display six as shown in block 424 which prompts the user to enter the sensor number and label. The user responds by entering the tire number and a label designation such as left front, right front, left rear, right rear or spare as shown on the keypad presented in FIG. 10 followed by the enter key as shown in block 426. If this is the last tire to be programmed, then the program proceeds to point B of FIG. 14C. If, however, this is not the last tire to be programmed, the program returns back to block 424 with display six.

Figure 14A:
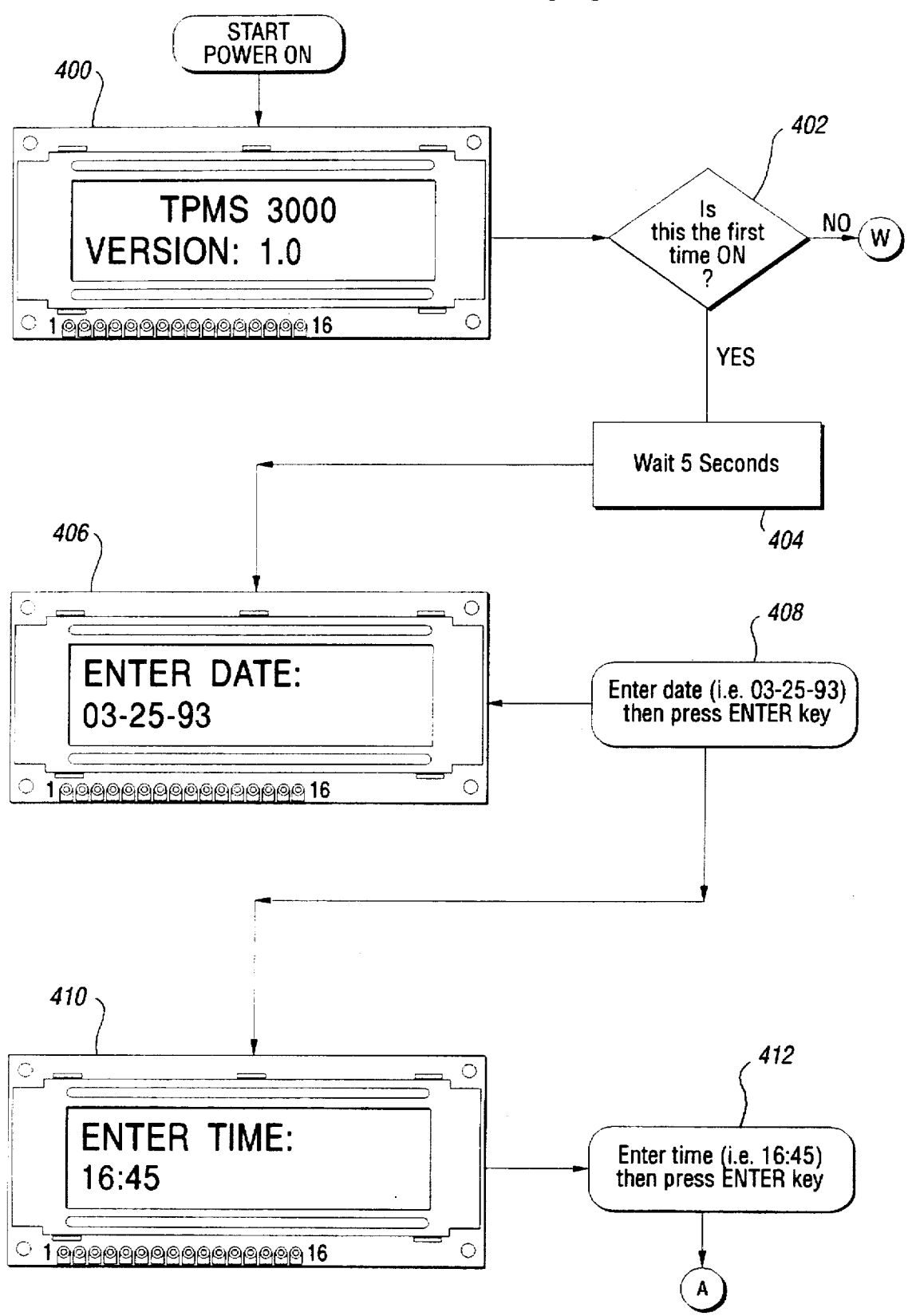
Figure 14C:
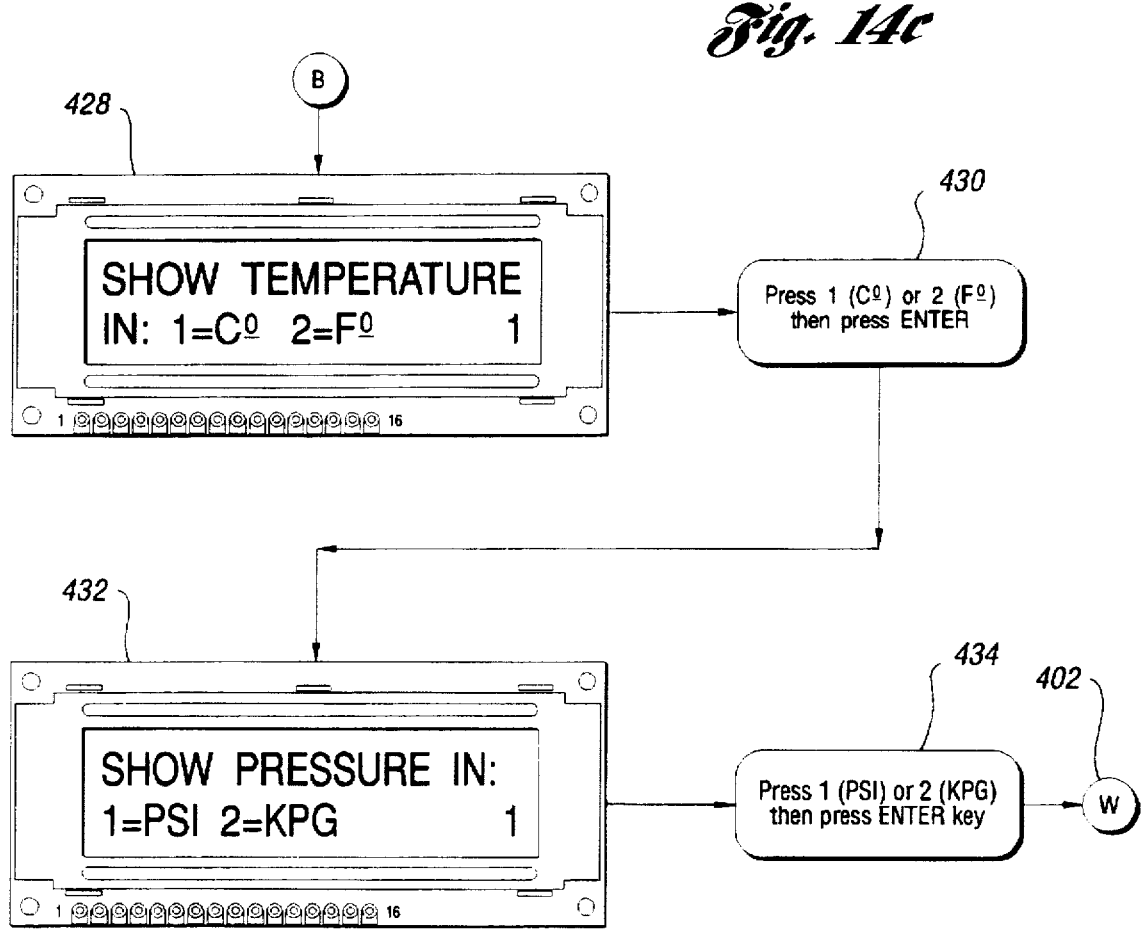
Figure 14B:
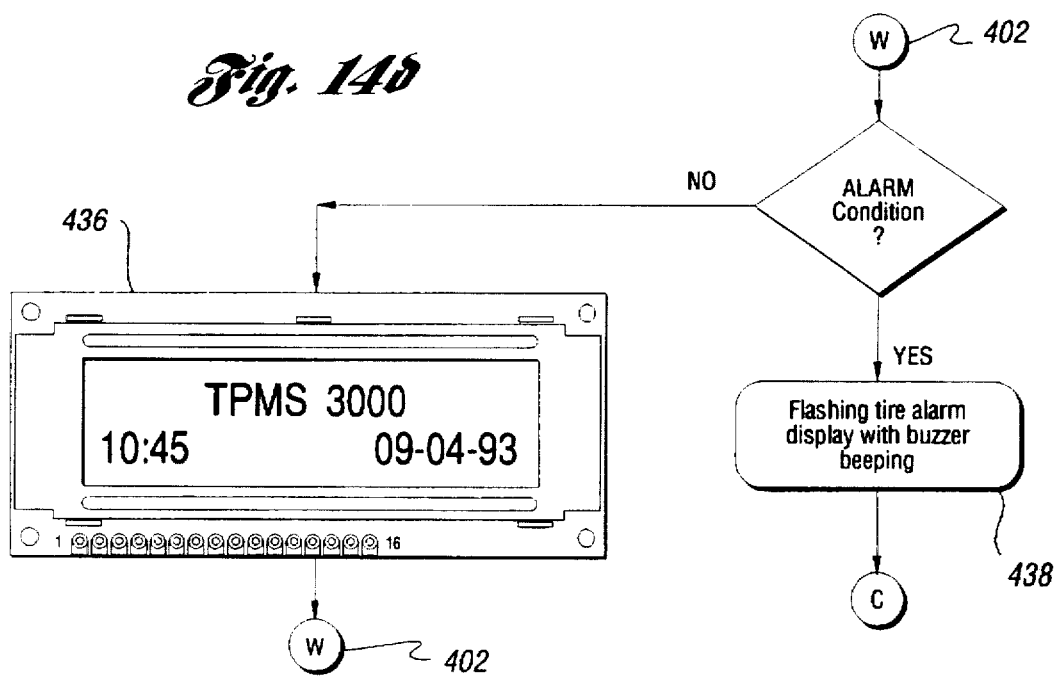
Figure 14F:
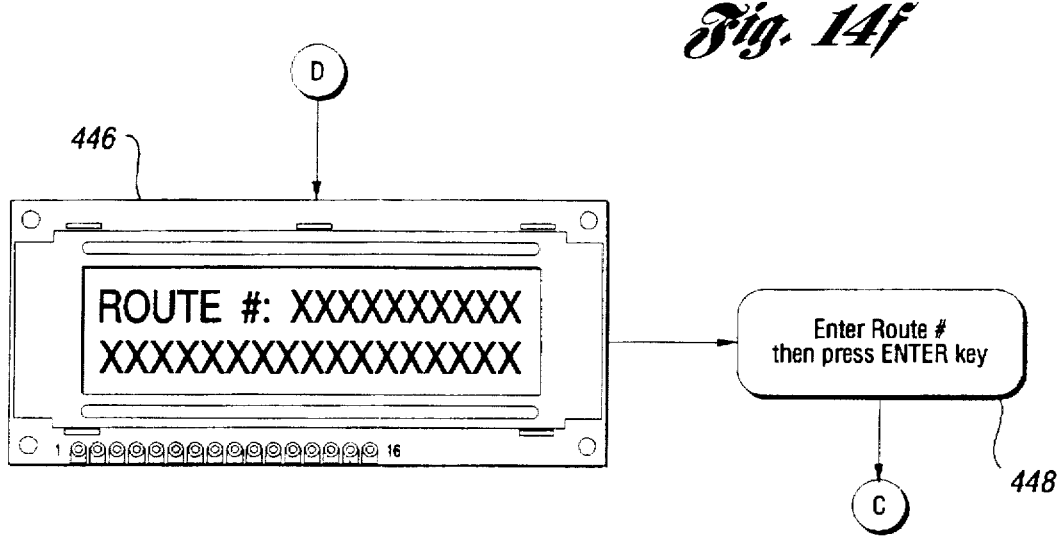

Turning now to FIG. 14C, point B directs the software to present display seven as shown in block 428. Display seven prompts the user to choose between degrees centigrade or degrees Fahrenheit for temperature displays. The user then enters one for degrees centigrade displays or two for degrees fahrenheit displays followed by the enter key as shown in block 430.

The program then responds by presenting display eight as shown in block 432. Display eight prompts the user to choose between displaying the pressure in pounds per square inch or kilipascals per gram. The user responds by pressing one if psi are selected or pressing two if kpg are selected followed by the enter key as shown in block 434. The initial programming being then completed, the program then proceeds to point W 402 presented in FIG. 14D.

Turning now to FIG. 14D, the program begins by determining if any of the tires are in an alarm condition. If no tires are in an alarm condition, the program presents its operational display—display nine as shown in block 436. This display presents a heading for the system as well as the date and time. It should be noted that the program continually scans for alarm conditions being received as shown by the program returning to point W 402.

If an alarm condition is sensed meaning that either the temperature or the pressure in one of the tires has exceeded preset limits or thresholds, the system responds by flashing the tire alarm display in providing an audio alarm from buzzer 118 presented in FIG. 5 as shown in block 438. One such tire alarm display is presented in display 10 shown in block 440 of FIG. 14E. For illustrative purposes, the label "left front tire" is shown as well as the particular alarm condition, in this case, low pressure. It should be noted that display ten persists until the clear or problem fixed keys are pressed at which point the program reverts back to point W of FIG. 14D. If the left arrow key is pressed, then the program presents display eleven as shown in block 442. This display presents the tire number as well as the temperature and pressure as read for that particular tire. The program then waits for ten seconds and presents display 12 as shown in block 444. Block 444 prompts the user to enter the driver number and then press enter as shown in block 446. The program then proceeds to present display thirteen as shown in block 446 of FIG. 14F. Display thirteen prompts the user to enter the route number and then press the enter key as shown in block 448. The program then proceeds back to display ten of FIG. 14E as shown in block 440, the alarm display.

Figure 18A:
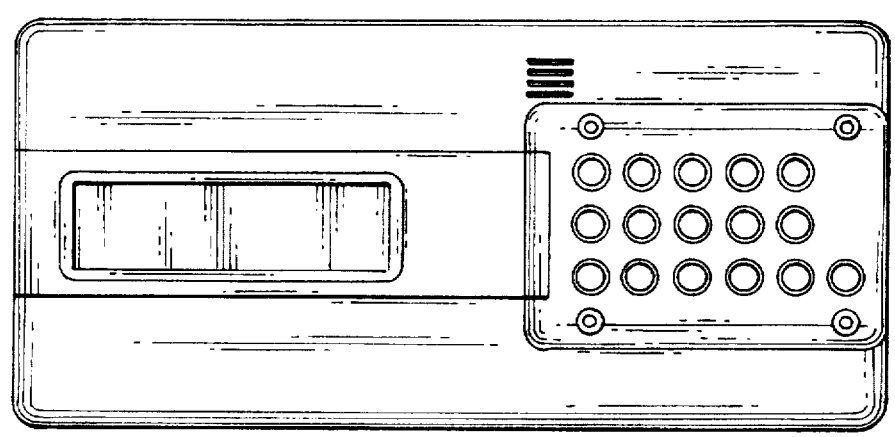
FIG. 18A presents a top view of the receiver/user interface unit of one embodiment of the present invention.
Figure 18B:
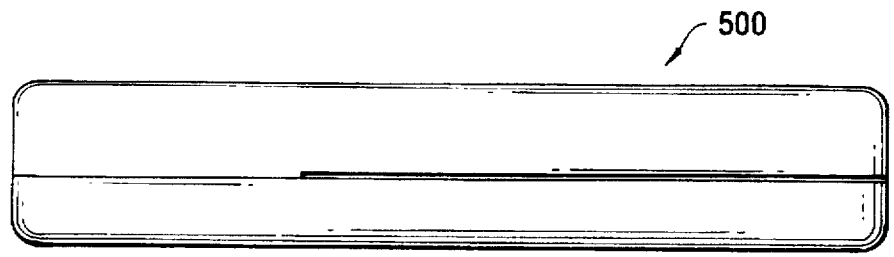
FIG. 18B presents a side view of the receiver/user interface unit of one embodiment of the present invention.

The LCD display unit 114 and matrix keypad 116 of receiver/user interface unit 14 of the present invention could be located at various points within the vehicle. The functionality of devices 114 and 116 could be incorporated into existing vehicle display and input units. Further, these devices 114 and 116 could be housed in a separate unit 500 as shown in FIGS. 18a and 18b. This separate unit could be mounted in such positions as a vehicle dashboard, a vehicle rearview mirror or headliner, a vehicle center console or a vehicle visor. Additional functions and devices could be integrated into this unit 500 such as a radar detector or a vehicle compass.

While the best mode for carrying out the invention has been described in detail, those familiar with the art to which this invention relates will recognize various alternative designs and embodiments for practicing the invention as defined by the following claims.

What is claimed is:

1. A system for monitoring a status of a parameter of a tire for a vehicle, the system comprising:
   a sensor, disposed within the tire, for generating a signal indicative of the parameter of the tire independently of magnitude of the parameter;
   a programmable processor, in electrical communication with the sensor for determining status of the tire parameter by comparing the tire parameter to a selected threshold;
   a transmitter, in electrical communication with the processor for transmitting a status signal indicative of the status of the tire parameter along a first communications link;
   a monitor, in communication with the first communications link, for monitoring the status of the tire parameter;
   a communication unit in electrical communication with the processor having a first receiver for receiving a processor control command; and
   a remote controller, positionable for communication with the communication unit via a second communications link, for initiating the processor control command.

2. The system of claim 1 wherein the communication unit further includes a second transmitter for sending a transmission in response to the processor control command.

3. The system of claim 2 wherein the remote controller further comprises a second receiver for receiving the transmission sent by the second transmitter.

4. The system of claim 1 wherein the processor control command includes a command to change the selected threshold.

5. The system of claim 3 wherein the processor control command includes a command to transmit a controller parameter.

6. The system of claim 5 wherein the controller parameter includes a tire identification code.

7. The system of claim 5 wherein the controller parameter includes a controller identification.

8. The system of claim 3 wherein the processor control command includes a command to test the sensor and to transmit a test result.

9. The system of claim 1 wherein the second communications link comprises an inductively coupled channel.

10. The system of claim 1 wherein the tire parameter is inflation pressure within the tire.

11. The system of claim 1 wherein the tire parameter is temperature within the tire.

12. A system for monitoring a parameter of a tire for a vehicle, the system comprising:
   a sensor, disposed within the tire, for generating a signal indicative of the parameter of the tire;
   a transmitter, in electrical communication with the sensor for transmitting the generated signal along a first communications link;
   a monitor, in communication with the first communications link, for monitoring the tire parameter by receiving the generated signal;
   a proqrammable processor, in electrical communication with the monitor for determining an alarm condition based upon the monitored tire parameter;
   a communication unit in electrical communication with the processor having a first receiver for receiving a processor control command; and
   a remote controller, positionable for electrical communication with the communication unit along a second communications link, for initiating the processor control command.

13. A system for monitoring a parameter of an inflatable tire for a vehicle, the system comprising:
   a sensor, disposed within the tire, for generating a signal indicative of the parameter of the tire;
   a transmitter, in electrical communication with the sensor for transmitting the generated signal along a first communications link;
   a piezo-electric element, for supplying power to the transmitter independent of inflation pressure of the time;
   a capacitive element connected to the piezo-electric element for storing energy and providing power to the transmitter when the inflatable tire is stationary; and
   a monitor, in communication with the first communications link, for monitoring the tire parameter by receiving the generated signal.

14. The system of claim 12 wherein the second communications link includes an inductively coupled channel.

15. The system of claim 13 wherein the piezo-electric element is mounted on a weighted member which vibrates when the inflatable tire spins.

16. The system of claim 12 wherein the remote controller generates a processor control command to change the selected threshold.

17. The system of claim 12 wherein the processor control command changes the system configuration.

* * * * *

US005741966C1

(12) EX PARTE REEXAMINATION CERTIFICATE (7252nd)
United States Patent
Handfield et al.

(10) Number: US 5,741,966 C1
(45) Certificate Issued: Dec. 22, 2009

(54) METHOD AND SYSTEM FOR MONITORING A PARAMETER OF A VEHICLE TIRE

(75) Inventors: Michael Handfield, Rochester, MI (US); Helene Laliberte, Rochester, MI (US)

(73) Assignee: MHL Tek, LLC, Rochester Hills, MI (US)

Reexamination Request:
No. 90/010,183, May 30, 2008
No. 90/010,293, Sep. 22, 2008

Reexamination Certificate for:
Patent No.: 5,741,966
Issued: Apr. 21, 1998
Appl. No.: 08/465,763
Filed: Jun. 6, 1995

Related U.S. Application Data

(62) Division of application No. 08/101,379, filed on Aug. 3, 1993, now Pat. No. 5,473,938.

(51) Int. Cl.
*B60C 23/00* (2006.01)
*B60C 23/02* (2006.01)

(52) U.S. Cl. .................. 73/146.5; 73/146.2; 73/146.4
(58) Field of Classification Search .................. None
See application file for complete search history.

(56) References Cited

U.S. PATENT DOCUMENTS

| | | |
|---|---|---|
| 4,163,208 A | 7/1979 | Merz |
| 4,319,220 A | 3/1982 | Pappas et al. |
| 4,468,650 A | 8/1984 | Barbee |
| 4,567,160 A | 1/1986 | Nay et al. |
| 4,567,459 A | 1/1986 | Folger et al. |
| 4,567,460 A | 1/1986 | Gebler |
| 4,695,823 A | 9/1987 | Vernon |
| 4,717,905 A | 1/1988 | Morrison et al. |
| 4,734,674 A | 3/1988 | Thomas et al. |
| 4,845,649 A | 7/1989 | Eckardt et al. |
| 4,966,034 A | 10/1990 | Bock et al. |
| 4,970,491 A | 11/1990 | Saint et al. |
| 5,006,844 A | 4/1991 | Ohta et al. |
| 5,181,975 A | 1/1993 | Pollack et al. |
| 5,231,872 A | 8/1993 | Bowler et al. |
| 5,289,160 A | 2/1994 | Fiorletta |
| 5,289,161 A | 2/1994 | Huang |
| 5,301,553 A | 4/1994 | Schultz et al. |
| 5,302,939 A | 4/1994 | Downs et al. |
| 5,315,866 A | 5/1994 | Righi |
| 5,413,159 A | 5/1995 | Olney et al. |
| 5,442,553 A | 8/1995 | Parrillo |
| 5,463,374 A | 10/1995 | Mendez et al. |
| 5,483,827 A | 1/1996 | Kulka et al. |
| 5,513,525 A | 5/1996 | Schurmann |
| 5,541,574 A | 7/1996 | Lowe et al. |
| 5,546,070 A | 8/1996 | Ellmann et al. |
| 5,559,484 A | 9/1996 | Nowicki et al. |
| 5,600,301 A | 2/1997 | Robinson |
| 5,602,524 A | 2/1997 | Mock et al. |
| 5,741,966 A | 4/1998 | Handfield et al. |

FOREIGN PATENT DOCUMENTS

| | | |
|---|---|---|
| EP | 0 450 653 | 10/1991 |
| IT | 1219753 | 4/1988 |
| IT | 1219753 | 5/1990 |
| JP | S62-198505 | 9/1987 |
| JP | HEI 3 1991-271485 | 4/1993 |

OTHER PUBLICATIONS

SAE Transactions Journal of Passenger Cars vol. 98, "Real Time Tire Pressure Electronic Monitoring System with Dashboard Possibilities," by Patrice Gay & Denis Bugnot, published 1989.
Gay et al., "Real Time Tire Pressure Electronic Monitoring System with Dashboard Possibilities," SAE Transactions, Journal of Passenger Cars (1989) vol. 98, pp. 212–221.
Certified English–Language Translation of IT 1219753.

*Primary Examiner*—Anjan K. Deb

(57) ABSTRACT

The present invention relates to a method and system for monitoring a parameter of a vehicle tire. In one embodiment, a detector unit disposed within the tire communicates with a central receiver unit over an electromagnetic path comprising one or more conductive components of the vehicle. Other embodiments of the invention include additional communications links for receiving information from and controlling the detector unit and the receiver.

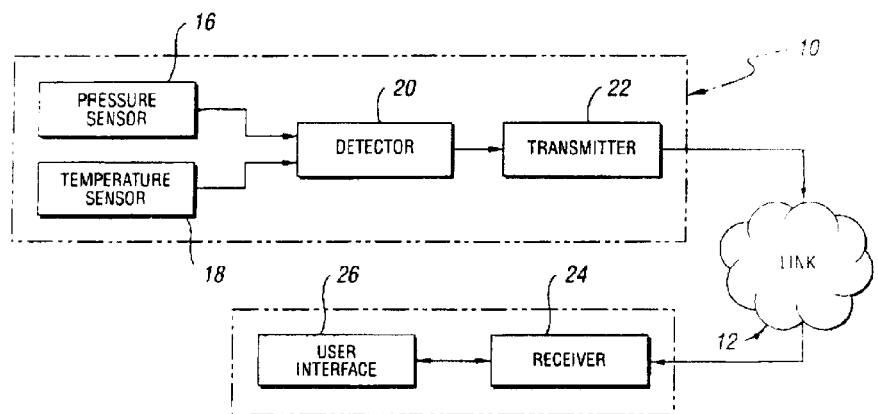

US 5,741,966 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–11 is confirmed.

Claims 12 and 13 are determined to be patentable as amended.

Claims 14–17, dependent on an amended claim, are determined to be patentable.

New claims 18–31 are added and determined to be patentable.

12. A system for monitoring a parameter of a tire for a vehicle, the system comprising:
   a sensor, disposed within the tire, for generating a signal indicative of the parameter of the tire;
   a transmitter, in electrical communication with the sensor for transmitting the generated signal along a first communications link, *wherein the first communications link comprises a ground plane of the vehicle*;
   a monitor, in communication with the first communications link, for monitoring the tire parameter by receiving the generated signal;
   a [proqrammable] *programmable* processor, in electrical communication with the monitor for determining an alarm condition based upon the monitored tire parameter;
   a communication unit in electrical communication with the processor having a first receiver for receiving a processor control command; and
   a remote controller, positionable for electrical communication with the communication unit along a second communications link, for initiating the processor control command.

13. A system for monitoring a parameter of an inflatable tire for a vehicle, the system comprising:
   a sensor, disposed within the tire, for generating a signal indicative of the parameter of the tire;
   a transmitter, in electrical communication with the sensor for transmitting the generated signal along a first communications link, *wherein the first communications link comprises a ground plane of the vehicle*;
   a piezo-electric element, for supplying power to the transmitter independent of inflation pressure of the [time] *tire*;
   a capacitive element connected to the piezo-electric element for storing energy and providing power to the transmitter when the inflatable tire is stationary; and
   a monitor, in communication with the first communications link, for monitoring the tire parameter by receiving the generated signal.

*18. A system for monitoring a status of a parameter of a tire for a vehicle, the system comprising:*
   *a sensor, disposed within the tire, for generating a signal indicative of the parameter of the tire independently of magnitude of the parameter;*
   *a programmable processor, in electrical communication with the sensor, for determining status of the tire parameter by comparing the tire parameter to a selected threshold, wherein the programmable processor is disposed within a housing of the sensor;*
   *a transmitter, in electrical communication with the processor, for transmitting the signal indicative of the status of the tire parameter along a first communications link, wherein the transmitter is disposed within the housing of the sensor;*
   *a monitor, in communication with the first communications link, for monitoring the status of the tire parameter;*
   *a communication unit in electrical communication with the processor having a first receiver for receiving a processor control command, wherein the communication unit is disposed within the housing of the sensor; and*
   *a remote controller, positionable for communication with the communication unit via a second communications link, for initiating the processor control command.*

*19. The system of claim 18, wherein the second communications link comprises an inductively coupled channel.*

*20. The system of claim 18 wherein the monitor comprises a liquid crystal display (LCD) capable of displaying alphanumeric characters.*

*21. The system of claim 20 wherein the LCD display is located in the vehicle dashboard.*

*22. The system of claim 18 wherein the processor control command comprises a tire identification number.*

*23. The system of claim 18 wherein the processor control command comprises a pressure threshold.*

*24. The system of claim 18 wherein the processor control command comprises a temperature threshold.*

*25. The system of claim 18 wherein the programmable processor comprises oscillator circuitry, analog-to-digital conversion cicuitry and modulation circuitry for generating a radio frequency (RF) signal indicative of a status of the tire parameter.*

*26. The system of claim 18 wherein the first communications link comprises a ground plane of the vehicle.*

*27. A system for monitoring a parameter of a tire for a vehicle, the system comprising:*
   *a sensor, disposed within the tire, for generating a signal indicative of the parameter of the tire, independently of a magnitude of the parameter, wherein the sensor comprises a power supply and oscillator circuitry for generating the signal;*
   *a transmitter, disposed within the tire and in electrical communication with the sensor, for transmitting the generated signal along a first communications link;*
   *a monitor, in communication with the first communications link, for monitoring the tire parameter by receiving the generated signal, wherein the monitor comprises a receiver and a display for displaying information indicative of the parameter of the tire;*
   *a programmable processor, in electrical communication with the monitor for determining an alarm condition based upon the monitored tire parameter, wherein the alarm condition is determined when the programmable processor determines that the parameter exceeds a preset threshold;* a communication unit in electrical communication with the processor having a first receiver for receiving a processor control command; and a remote controller, positionable for electrical communication with the communication unit along a second communications link, for initiating the processor control command.

28. The system of claim 27 wherein the processor control command comprises a tire identification command.

29. The system of claim 27 wherein the display comprises a liquid crystal display (LCD).

30. The system of claim 27 wherein the first communications link comprises a ground plane of the vehicle.

31. The system of claim 30 wherein the sensor further comprises an impedance matching circuit to match an impedance of the sensor to an impedence of the ground plane of the vehicle.

* * * * *